(12) United States Patent
Popovich et al.

(10) Patent No.: US 11,874,477 B2
(45) Date of Patent: *Jan. 16, 2024

(54) WEARABLE DATA DISPLAY

(71) Applicants: Digilens Inc., Sunnyvale, CA (US);
Rockwell Collins, Inc., Cedar Rapids, IA (US)

(72) Inventors: Milan Momcilo Popovich, Leicester (GB); Jonathan David Waldern, Los Altos Hills, CA (US)

(73) Assignees: Digilens Inc., Sunnyvale, CA (US); Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,918

(22) Filed: Mar. 3, 2022

(65) Prior Publication Data

US 2022/0260847 A1   Aug. 18, 2022

Related U.S. Application Data

(63) Continuation of application No. 16/855,812, filed on Apr. 22, 2020, now Pat. No. 11,287,666, which is a
(Continued)

(51) Int. Cl.
*G02B 27/42* (2006.01)
*F21V 8/00* (2006.01)
(Continued)

(52) U.S. Cl.
CPC ....... *G02B 27/4227* (2013.01); *G02B 6/0028* (2013.01); *G02B 6/0035* (2013.01);
(Continued)

(58) Field of Classification Search
CPC .............. G02B 27/4227; G02B 6/0028; G02B 6/0035; G02B 6/0078; G02B 27/0172;
(Continued)

(56) References Cited

U.S. PATENT DOCUMENTS

| 1,043,938 A | 11/1912 | Huttenlocher | |
| 6,115,152 A * | 9/2000 | Popovich | G03H 1/26 |
| | | | 353/30 |

(Continued)

FOREIGN PATENT DOCUMENTS

| BR | PI0720469 A2 | 1/2014 |
| CA | 2889727 A1 | 6/2014 |

(Continued)

OTHER PUBLICATIONS

U.S. Appl. No. 61/344,748, filed Sep. 28, 2010.
(Continued)

*Primary Examiner* — William R Alexander
*Assistant Examiner* — Sharrief I Broome
(74) *Attorney, Agent, or Firm* — Suiter Swantz pc llo

(57) ABSTRACT

A transparent wearable data display having a source of collimated light, a deflector for deflecting the collimated light into a scanned beam, and a first of switchable grating elements sandwiched between first and second parallel transparent substrates, which together functioning as a first light guide. A first coupling is provided for directing the scanned beam into a first total internal reflection (TIR) light path of the first light guide along the first array column. The grating elements having diffracting and non-diffracting states, in their diffracting state deflecting light out of said light guide. The grating elements are switchable into their diffracting states one group of elements at a time.

20 Claims, 8 Drawing Sheets

Related U.S. Application Data continuation of application No. 14/794,356, filed on Jul. 8, 2015, now Pat. No. 10,642,058, which is a continuation of application No. 14/240,643, filed as application No. PCT/GB2012/000677 on Aug. 22, 2012, now abandoned.

(60) Provisional application No. 61/573,067, filed on Aug. 24, 2011.

(51) Int. Cl.
  *G02B 27/01* (2006.01)
  *G02F 1/29* (2006.01)
  *G02F 1/1334* (2006.01)
  *G02B 5/18* (2006.01)

(52) U.S. Cl.
  CPC ....... *G02B 6/0078* (2013.01); *G02B 27/0172* (2013.01); *G02F 1/292* (2013.01); *G02B 5/18* (2013.01); *G02B 27/0101* (2013.01); *G02B 2027/0118* (2013.01); *G02F 1/13342* (2013.01)

(58) Field of Classification Search
  CPC ....... G02B 5/18; G02B 27/0101; G02F 1/292; G02F 1/13342
  USPC .................... 359/316, 317, 318, 319, 320
  See application file for complete search history.

(56) References Cited

U.S. PATENT DOCUMENTS

| | | | |
|---|---|---|---|
| 6,281,457 B1 * | 8/2001 | Chang | H01R 13/701 200/50.01 |
| 6,580,529 B1 * | 6/2003 | Amitai | G02B 27/0944 359/13 |
| 10,089,516 B2 | 10/2018 | Popovich et al. | |
| 10,156,681 B2 | 12/2018 | Waldern et al. | |
| 10,185,154 B2 | 1/2019 | Popovich et al. | |
| 10,209,517 B2 | 2/2019 | Popovich et al. | |
| 10,216,061 B2 | 2/2019 | Popovich et al. | |
| 10,234,696 B2 | 3/2019 | Popovich et al. | |
| 10,241,330 B2 | 3/2019 | Popovich et al. | |
| 10,330,777 B2 | 6/2019 | Popovich et al. | |
| 10,359,736 B2 | 7/2019 | Popovich et al. | |
| 10,409,144 B2 | 9/2019 | Popovich et al. | |
| 10,423,813 B2 | 9/2019 | Popovich et al. | |
| 10,459,311 B2 | 10/2019 | Popovich et al. | |
| 10,527,797 B2 | 1/2020 | Waldern et al. | |
| 10,545,346 B2 | 1/2020 | Waldern et al. | |
| 10,642,058 B2 | 5/2020 | Popovich et al. | |
| 10,690,916 B2 | 6/2020 | Popovich et al. | |
| 10,859,768 B2 | 12/2020 | Popovich et al. | |
| 10,890,707 B2 | 1/2021 | Waldern et al. | |
| 2001/0024177 A1 | 9/2001 | Popovich | |
| 2001/0043163 A1 | 11/2001 | Waldern et al. | |
| 2001/0050756 A1 | 12/2001 | Tipton et al. | |
| 2002/0003509 A1 | 1/2002 | Lipton et al. | |
| 2002/0009299 A1 | 1/2002 | Lipton | |
| 2002/0011969 A1 | 1/2002 | Lipton et al. | |
| 2002/0012064 A1 | 1/2002 | Yamaguchi | |
| 2002/0021461 A1 | 2/2002 | Ono et al. | |
| 2002/0036825 A1 | 3/2002 | Lipton et al. | |
| 2002/0047837 A1 | 4/2002 | Suyama et al. | |
| 2002/0075240 A1 | 6/2002 | Lieberman et al. | |
| 2002/0093701 A1 | 7/2002 | Zhang et al. | |
| 2002/0110077 A1 | 8/2002 | Drobot et al. | |
| 2002/0126332 A1 | 9/2002 | Popovich | |
| 2002/0127497 A1 | 9/2002 | Brown et al. | |
| 2002/0131175 A1 | 9/2002 | Yagi et al. | |
| 2002/0150032 A1 | 10/2002 | Nishiuchi et al. | |
| 2002/0196332 A1 | 12/2002 | Lipton et al. | |
| 2003/0007070 A1 | 1/2003 | Lipton et al. | |
| 2003/0030912 A1 | 2/2003 | Gleckman et al. | |
| 2003/0038912 A1 | 2/2003 | Broer et al. | |
| 2003/0039442 A1 | 2/2003 | Bond et al. | |
| 2003/0063042 A1 | 4/2003 | Friesem et al. | |
| 2003/0063884 A1 | 4/2003 | Smith et al. | |
| 2003/0067685 A1 | 4/2003 | Niv | |
| 2003/0086670 A1 | 5/2003 | Moridaira et al. | |
| 2003/0107809 A1 | 6/2003 | Chen et al. | |
| 2003/0149346 A1 | 8/2003 | Amone et al. | |
| 2003/0175004 A1 | 9/2003 | Garito et al. | |
| 2003/0197154 A1 | 10/2003 | Manabe et al. | |
| 2003/0197157 A1 | 10/2003 | Sutherland et al. | |
| 2003/0202247 A1 | 10/2003 | Niv et al. | |
| 2003/0206329 A1 | 11/2003 | Ikeda et al. | |
| 2003/0228019 A1 | 12/2003 | Eichler et al. | |
| 2004/0004767 A1 | 1/2004 | Song | |
| 2004/0012833 A1 | 1/2004 | Newswanger et al. | |
| 2004/0047938 A1 | 3/2004 | Kosuga et al. | |
| 2004/0057138 A1 | 3/2004 | Tanijiri et al. | |
| 2004/0075830 A1 | 4/2004 | Miyake et al. | |
| 2004/0089842 A1 | 5/2004 | Sutherland et al. | |
| 2004/0109234 A1 | 6/2004 | Levola | |
| 2004/0112862 A1 | 6/2004 | Willson et al. | |
| 2004/0130797 A1 | 7/2004 | Travis | |
| 2004/0141217 A1 | 7/2004 | Endo et al. | |
| 2004/0156008 A1 | 8/2004 | Reznikov et al. | |
| 2004/0174348 A1 | 9/2004 | David | |
| 2004/0175627 A1 | 9/2004 | Sutherland et al. | |
| 2004/0179764 A1 | 9/2004 | Melikechi et al. | |
| 2004/0184156 A1 | 9/2004 | Gunn et al. | |
| 2004/0188617 A1 | 9/2004 | Devitt et al. | |
| 2004/0208446 A1 | 10/2004 | Bond et al. | |
| 2004/0208466 A1 | 10/2004 | Mossberg et al. | |
| 2004/0225025 A1 | 11/2004 | Sullivan et al. | |
| 2004/0263969 A1 | 12/2004 | Lipton et al. | |
| 2004/0263971 A1 | 12/2004 | Lipton et al. | |
| 2005/0018304 A1 | 1/2005 | Lipton et al. | |
| 2005/0079663 A1 | 4/2005 | Masutani et al. | |
| 2005/0083564 A1 | 4/2005 | Mallya et al. | |
| 2005/0105909 A1 | 5/2005 | Stone | |
| 2005/0122395 A1 | 6/2005 | Lipton et al. | |
| 2005/0134404 A1 | 6/2005 | Kajiya | |
| 2005/0135747 A1 | 6/2005 | Greiner et al. | |
| 2005/0136260 A1 | 6/2005 | Garcia | |
| 2005/0141066 A1 | 6/2005 | Ouchi | |
| 2005/0174321 A1 | 8/2005 | Ikeda et al. | |
| 2005/0180687 A1 | 8/2005 | Amitai | |
| 2005/0195276 A1 | 9/2005 | Lipton et al. | |
| 2005/0218377 A1 | 10/2005 | Lawandy | |
| 2005/0231774 A1 | 10/2005 | Hayashi et al. | |
| 2005/0232530 A1 | 10/2005 | Kekas | |
| 2005/0259217 A1 | 11/2005 | Lin et al. | |
| 2005/0259302 A9 | 11/2005 | Metz et al. | |
| 2005/0259944 A1 | 11/2005 | Anderson et al. | |
| 2005/0265585 A1 | 12/2005 | Rowe | |
| 2005/0269481 A1 | 12/2005 | David et al. | |
| 2005/0271258 A1 | 12/2005 | Rowe | |
| 2005/0286133 A1 | 12/2005 | Lipton | |
| 2006/0002274 A1 | 1/2006 | Kihara et al. | |
| 2006/0012878 A1 | 1/2006 | Tipton et al. | |
| 2006/0013977 A1 | 1/2006 | Duke et al. | |
| 2006/0043938 A1 | 3/2006 | O'Gorman et al. | |
| 2006/0055993 A1 | 3/2006 | Kobayashi et al. | |
| 2006/0093012 A1 | 5/2006 | Singh et al. | |
| 2006/0093793 A1 | 5/2006 | Miyakawa et al. | |
| 2006/0114564 A1 | 6/2006 | Sutherland et al. | |
| 2006/0119837 A1 | 6/2006 | Raguin et al. | |
| 2006/0119916 A1 | 6/2006 | Sutherland et al. | |
| 2006/0126179 A1 | 6/2006 | Levola | |
| 2006/0132914 A1 | 6/2006 | Weiss et al. | |
| 2006/0142455 A1 | 6/2006 | Agarwal et al. | |
| 2006/0146422 A1 | 7/2006 | Koike | |
| 2006/0159864 A1 | 7/2006 | Natarajan et al. | |
| 2006/0164593 A1 | 7/2006 | Peyghambarian et al. | |
| 2006/0171647 A1 | 8/2006 | Ye et al. | |
| 2006/0177180 A1 | 8/2006 | Tazawa et al. | |
| 2006/0181683 A1 | 8/2006 | Bhowmik et al. | |
| 2006/0191293 A1 | 8/2006 | Kuczma | |
| 2006/0215244 A1 | 9/2006 | Yosha et al. | |
| 2006/0215976 A1 | 9/2006 | Singh et al. | |
| 2006/0221063 A1 | 10/2006 | Ishihara | |

(56) References Cited

U.S. PATENT DOCUMENTS

| | | |
|---|---|---|
| 2006/0221448 A1 | 10/2006 | Nivon et al. |
| 2006/0228073 A1 | 10/2006 | Mukawa et al. |
| 2006/0268104 A1 | 11/2006 | Cowan et al. |
| 2006/0268412 A1 | 11/2006 | Downing et al. |
| 2006/0279662 A1 | 12/2006 | Kapellner et al. |
| 2006/0284974 A1 | 12/2006 | Lipton et al. |
| 2006/0285205 A1 | 12/2006 | Lipton et al. |
| 2006/0291021 A1 | 12/2006 | Mukawa |
| 2006/0291052 A1 | 12/2006 | Lipton et al. |
| 2006/0292493 A1 | 12/2006 | Shinotsuka et al. |
| 2007/0012777 A1 | 1/2007 | Tsikos et al. |
| 2007/0019152 A1 | 1/2007 | Caputo et al. |
| 2007/0019297 A1 | 1/2007 | Stewart et al. |
| 2007/0041684 A1* | 2/2007 | Popovich ............... G03B 13/06 348/E5.025 |
| 2007/0045596 A1 | 3/2007 | King et al. |
| 2007/0052929 A1 | 3/2007 | Allman et al. |
| 2007/0070476 A1 | 3/2007 | Yamada et al. |
| 2007/0070504 A1 | 3/2007 | Akutsu et al. |
| 2007/0070859 A1 | 3/2007 | Hirayama |
| 2007/0089625 A1 | 4/2007 | Grinberg et al. |
| 2007/0097502 A1 | 5/2007 | Lipton et al. |
| 2007/0109400 A1 | 5/2007 | Woodgate et al. |
| 2007/0109401 A1 | 5/2007 | Lipton et al. |
| 2007/0116409 A1 | 5/2007 | Bryan et al. |
| 2007/0127348 A1 | 6/2007 | Ooi et al. |
| 2007/0133089 A1 | 6/2007 | Lipton et al. |
| 2007/0133920 A1 | 6/2007 | Lee et al. |
| 2007/0133983 A1 | 6/2007 | Traff |
| 2007/0146624 A1 | 6/2007 | Duston et al. |
| 2007/0154153 A1 | 7/2007 | Fomitchov |
| 2007/0160325 A1 | 7/2007 | Son et al. |
| 2007/0177007 A1 | 8/2007 | Lipton et al. |
| 2007/0182915 A1 | 8/2007 | Osawa et al. |
| 2007/0183650 A1 | 8/2007 | Lipton et al. |
| 2007/0188602 A1 | 8/2007 | Cowan et al. |
| 2007/0188837 A1 | 8/2007 | Shimizu et al. |
| 2007/0195409 A1 | 8/2007 | Yun et al. |
| 2007/0206155 A1 | 9/2007 | Lipton |
| 2007/0211164 A1 | 9/2007 | Olsen et al. |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0001909 A1 | 1/2008 | Lim |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0089073 A1 | 4/2008 | Hikmet |
| 2008/0106775 A1 | 5/2008 | Amitai et al. |
| 2008/0106779 A1 | 5/2008 | Peterson et al. |
| 2008/0112053 A1* | 5/2008 | Levner ............... G02B 6/02085 359/569 |
| 2008/0117289 A1 | 5/2008 | Schowengerdt et al. |
| 2008/0136916 A1 | 6/2008 | Wolff |
| 2008/0136923 A1 | 6/2008 | Inbar et al. |
| 2008/0138013 A1 | 6/2008 | Parriaux |
| 2008/0143964 A1 | 6/2008 | Cowan et al. |
| 2008/0149517 A1 | 6/2008 | Lipton et al. |
| 2008/0151370 A1 | 6/2008 | Cook et al. |
| 2008/0151379 A1 | 6/2008 | Amitai |
| 2008/0186573 A1 | 8/2008 | Lipton |
| 2008/0186574 A1 | 8/2008 | Robinson et al. |
| 2008/0186604 A1 | 8/2008 | Amitai |
| 2008/0193085 A1 | 8/2008 | Singh et al. |
| 2008/0198471 A1 | 8/2008 | Amitai |
| 2008/0225187 A1 | 9/2008 | Yamanaka |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0278812 A1 | 11/2008 | Amitai |
| 2008/0285137 A1 | 11/2008 | Simmonds et al. |
| 2008/0285140 A1 | 11/2008 | Amitai |
| 2008/0297731 A1 | 12/2008 | Powell et al. |
| 2008/0297807 A1 | 12/2008 | Feldman et al. |
| 2008/0298649 A1 | 12/2008 | Ennis et al. |
| 2008/0303895 A1 | 12/2008 | Akka et al. |
| 2008/0303896 A1 | 12/2008 | Lipton et al. |
| 2008/0304111 A1 | 12/2008 | Queenan et al. |
| 2008/0309586 A1 | 12/2008 | Vitale |
| 2008/0316303 A1 | 12/2008 | Chiu et al. |
| 2008/0316375 A1 | 12/2008 | Lipton et al. |
| 2009/0017424 A1 | 1/2009 | Yoeli et al. |
| 2009/0019222 A1 | 1/2009 | Verma et al. |
| 2009/0052017 A1 | 2/2009 | Sasaki |
| 2009/0052046 A1 | 2/2009 | Amitai |
| 2009/0052047 A1 | 2/2009 | Amitai |
| 2009/0067774 A1 | 3/2009 | Magnusson |
| 2009/0074356 A1 | 3/2009 | Sanchez et al. |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128495 A1 | 5/2009 | Kong et al. |
| 2009/0128902 A1 | 5/2009 | Niv et al. |
| 2009/0128911 A1 | 5/2009 | Itzkovitch et al. |
| 2009/0136246 A1 | 5/2009 | Murakami |
| 2009/0141324 A1 | 6/2009 | Mukawa |
| 2009/0153437 A1 | 6/2009 | Aharoni |
| 2009/0169152 A1 | 7/2009 | Östergard |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0242021 A1 | 10/2009 | Petkie et al. |
| 2009/0296218 A1 | 12/2009 | Ryytty |
| 2009/0303599 A1 | 12/2009 | Levola |
| 2009/0316246 A1 | 12/2009 | Asai et al. |
| 2010/0014312 A1 | 1/2010 | Travis |
| 2010/0023193 A1 | 1/2010 | Ebuchi et al. |
| 2010/0039796 A1 | 2/2010 | Mukawa |
| 2010/0053565 A1 | 3/2010 | Mizushima et al. |
| 2010/0060551 A1 | 3/2010 | Sugiyama et al. |
| 2010/0060990 A1 | 3/2010 | Wertheim et al. |
| 2010/0065726 A1 | 3/2010 | Zhong et al. |
| 2010/0079865 A1 | 4/2010 | Saarikko et al. |
| 2010/0086256 A1 | 4/2010 | Bakir et al. |
| 2010/0092124 A1 | 4/2010 | Magnusson et al. |
| 2010/0096562 A1 | 4/2010 | Klunder et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0135615 A1 | 6/2010 | Ho et al. |
| 2010/0136319 A1 | 6/2010 | Imai et al. |
| 2010/0141555 A1 | 6/2010 | Rorberg et al. |
| 2010/0149073 A1 | 6/2010 | Chaum et al. |
| 2010/0165465 A1 | 7/2010 | Levola |
| 2010/0165660 A1 | 7/2010 | Weber et al. |
| 2010/0171680 A1 | 7/2010 | Lapidot et al. |
| 2010/0177388 A1 | 7/2010 | Cohen et al. |
| 2010/0202725 A1* | 8/2010 | Popovich ............ G02F 1/13731 385/10 |
| 2010/0214659 A1 | 8/2010 | Levola |
| 2010/0220293 A1 | 9/2010 | Mizushima et al. |
| 2010/0225834 A1 | 9/2010 | Li |
| 2010/0231532 A1 | 9/2010 | Nho et al. |
| 2010/0231705 A1 | 9/2010 | Yahav et al. |
| 2010/0232003 A1 | 9/2010 | Baldy et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284090 A1 | 11/2010 | Simmonds |
| 2010/0284180 A1 | 11/2010 | Popovich et al. |
| 2010/0296163 A1 | 11/2010 | Saarikko |
| 2010/0299814 A1 | 12/2010 | Celona et al. |
| 2010/0315719 A1 | 12/2010 | Saarikko et al. |

(56) References Cited

U.S. PATENT DOCUMENTS

| | | |
|---|---|---|
| 2010/0321781 A1 | 12/2010 | Levola et al. |
| 2010/0322555 A1 | 12/2010 | Vermeulen et al. |
| 2011/0001895 A1 | 1/2011 | Dahl |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Järvenpää et al. |
| 2011/0026128 A1 | 2/2011 | Baker et al. |
| 2011/0026774 A1 | 2/2011 | Flohr et al. |
| 2011/0032602 A1 | 2/2011 | Rothenberg |
| 2011/0032618 A1 | 2/2011 | Handerek et al. |
| 2011/0032706 A1 | 2/2011 | Mukawa |
| 2011/0038024 A1 | 2/2011 | Wang et al. |
| 2011/0050548 A1 | 3/2011 | Blumenfeld et al. |
| 2011/0063604 A1* | 3/2011 | Hamre .............. G06V 40/1318 250/330 |
| 2011/0096401 A1 | 4/2011 | Levola |
| 2011/0102711 A1 | 5/2011 | Sutherland et al. |
| 2011/0109880 A1 | 5/2011 | Nummela |
| 2011/0157707 A1 | 6/2011 | Tilleman et al. |
| 2011/0164221 A1 | 7/2011 | Tilleman et al. |
| 2011/0187293 A1 | 8/2011 | Travis |
| 2011/0211239 A1 | 9/2011 | Mukawa et al. |
| 2011/0221656 A1 | 9/2011 | Haddick et al. |
| 2011/0235179 A1 | 9/2011 | Simmonds |
| 2011/0235365 A1 | 9/2011 | McCollum et al. |
| 2011/0236803 A1 | 9/2011 | Weiser et al. |
| 2011/0238399 A1 | 9/2011 | Ophir et al. |
| 2011/0242349 A1 | 10/2011 | Zuha et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0027347 A1 | 2/2012 | Mathal et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0162549 A1 | 6/2012 | Gao et al. |
| 2012/0162764 A1 | 6/2012 | Shimizu |
| 2012/0176665 A1 | 7/2012 | Song et al. |
| 2012/0183888 A1 | 7/2012 | Oliveira et al. |
| 2012/0194420 A1 | 8/2012 | Osterhout et al. |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large |
| 2012/0214089 A1 | 8/2012 | Hönel et al. |
| 2012/0214090 A1 | 8/2012 | Weiser et al. |
| 2012/0218481 A1 | 8/2012 | Popovich et al. |
| 2012/0224062 A1 | 9/2012 | Lacoste et al. |
| 2012/0235884 A1 | 9/2012 | Miller et al. |
| 2012/0235886 A1 | 9/2012 | Border et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0281943 A1 | 11/2012 | Popovich et al. |
| 2012/0290973 A1 | 11/2012 | Robertson et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2012/0326950 A1 | 12/2012 | Park et al. |
| 2013/0016324 A1 | 1/2013 | Travis |
| 2013/0016362 A1 | 1/2013 | Gong et al. |
| 2013/0021392 A1 | 1/2013 | Travis |
| 2013/0021586 A1 | 1/2013 | Lippey |
| 2013/0033485 A1 | 2/2013 | Kollin et al. |
| 2013/0039619 A1 | 2/2013 | Laughlin |
| 2013/0044376 A1 | 2/2013 | Valera et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0088637 A1 | 4/2013 | Duparre |
| 2013/0093893 A1 | 4/2013 | Schofield et al. |
| 2013/0101253 A1 | 4/2013 | Popovich et al. |
| 2013/0107186 A1 | 5/2013 | Ando et al. |
| 2013/0117377 A1 | 5/2013 | Miller |
| 2013/0125027 A1 | 5/2013 | Abovitz |
| 2013/0128230 A1 | 5/2013 | Macnamara |
| 2013/0138275 A1 | 5/2013 | Nauman et al. |
| 2013/0141937 A1 | 6/2013 | Katsuta et al. |
| 2013/0143336 A1 | 6/2013 | Jain |
| 2013/0163089 A1 | 6/2013 | Bohn |
| 2013/0170031 A1 | 7/2013 | Bohn et al. |
| 2013/0176704 A1 | 7/2013 | Lanman et al. |
| 2013/0184904 A1 | 7/2013 | Gadzinski |
| 2013/0200710 A1 | 8/2013 | Robbins |
| 2013/0207887 A1 | 8/2013 | Raffle et al. |
| 2013/0224634 A1 | 8/2013 | Bemneth et al. |
| 2013/0229717 A1 | 9/2013 | Amitai |
| 2013/0249895 A1 | 9/2013 | Westerinen et al. |
| 2013/0250207 A1 | 9/2013 | Bohn |
| 2013/0250430 A1 | 9/2013 | Robbins et al. |
| 2013/0250431 A1 | 9/2013 | Robbins et al. |
| 2013/0257848 A1 | 10/2013 | Westerinen et al. |
| 2013/0258701 A1 | 10/2013 | Westerinen et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0301014 A1 | 11/2013 | DeJong et al. |
| 2013/0305437 A1 | 11/2013 | Weller et al. |
| 2013/0312811 A1 | 11/2013 | Aspnes et al. |
| 2013/0314789 A1 | 11/2013 | Saarikko et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2013/0342525 A1 | 12/2013 | Benko et al. |
| 2014/0003762 A1 | 1/2014 | Macnamara |
| 2014/0009809 A1 | 1/2014 | Pyun et al. |
| 2014/0024159 A1 | 1/2014 | Jain |
| 2014/0027006 A1 | 1/2014 | Foley et al. |
| 2014/0037242 A1 | 2/2014 | Popovich et al. |
| 2014/0043672 A1 | 2/2014 | Clarke et al. |
| 2014/0043689 A1 | 2/2014 | Mason |
| 2014/0055845 A1 | 2/2014 | Jain |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0104685 A1 | 4/2014 | Bohn et al. |
| 2014/0118647 A1 | 5/2014 | Momonoi et al. |
| 2014/0130132 A1 | 5/2014 | Cahill et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0160576 A1 | 6/2014 | Robbins |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0168783 A1 | 6/2014 | Luebke et al. |
| 2014/0172296 A1 | 6/2014 | Shtukater |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |

(56) References Cited

U.S. PATENT DOCUMENTS

| | | |
|---|---|---|
| 2014/0240834 A1 | 8/2014 | Mason |
| 2014/0240842 A1 | 8/2014 | Nguyen et al. |
| 2014/0255662 A1 | 9/2014 | Enomoto et al. |
| 2014/0267420 A1 | 9/2014 | Schowengerdt et al. |
| 2014/0268353 A1 | 9/2014 | Fujimura et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0086907 A1 | 3/2015 | Mizuta et al. |
| 2015/0107671 A1 | 4/2015 | Bodan et al. |
| 2015/0109763 A1 | 4/2015 | Shinkai et al. |
| 2015/0125109 A1 | 5/2015 | Robbins et al. |
| 2015/0148728 A1 | 5/2015 | Sallum et al. |
| 2015/0160529 A1 | 6/2015 | Popovich et al. |
| 2015/0167868 A1 | 6/2015 | Boncha |
| 2015/0177686 A1 | 6/2015 | Lee et al. |
| 2015/0177688 A1 | 6/2015 | Popovich et al. |
| 2015/0185475 A1 | 7/2015 | Saarikko et al. |
| 2015/0219834 A1 | 8/2015 | Nichol et al. |
| 2015/0235447 A1 | 8/2015 | Abovitz et al. |
| 2015/0235448 A1 | 8/2015 | Schowengerdt |
| 2015/0243068 A1 | 8/2015 | Solomon |
| 2015/0247975 A1 | 9/2015 | Abovitz et al. |
| 2015/0260994 A1 | 9/2015 | Akutsu et al. |
| 2015/0268415 A1 | 9/2015 | Schowengerdt et al. |
| 2015/0277375 A1 | 10/2015 | Large et al. |
| 2015/0285682 A1 | 10/2015 | Popovich et al. |
| 2015/0288129 A1 | 10/2015 | Jain |
| 2015/0289762 A1 | 10/2015 | Popovich et al. |
| 2015/0309264 A1 | 10/2015 | Abovitz et al. |
| 2015/0316768 A1 | 11/2015 | Simmonds |
| 2015/0346490 A1 | 12/2015 | TeKolste et al. |
| 2015/0346495 A1 | 12/2015 | Welch et al. |
| 2015/0355394 A1 | 12/2015 | Valera et al. |
| 2016/0003847 A1 | 1/2016 | Ryan et al. |
| 2016/0004090 A1 | 1/2016 | Popovich et al. |
| 2016/0026253 A1 | 1/2016 | Bradski et al. |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1 | 2/2016 | Valera et al. |
| 2016/0077338 A1 | 3/2016 | Robbins et al. |
| 2016/0085300 A1 | 3/2016 | Robbins et al. |
| 2016/0116739 A1 | 4/2016 | TeKolste et al. |
| 2016/0124223 A1 | 5/2016 | Shinbo et al. |
| 2016/0132025 A1 | 5/2016 | Taff et al. |
| 2016/0178901 A1 | 6/2016 | Ishikawa |
| 2016/0195664 A1 | 7/2016 | Fattal et al. |
| 2016/0209648 A1 | 7/2016 | Haddick et al. |
| 2016/0209657 A1 | 7/2016 | Popovich et al. |
| 2016/0231568 A1 | 8/2016 | Saarikko et al. |
| 2016/0231570 A1 | 8/2016 | Levola et al. |
| 2016/0238772 A1 | 8/2016 | Waldern et al. |
| 2016/0266398 A1 | 9/2016 | Poon et al. |
| 2016/0274362 A1 | 9/2016 | Tinch |
| 2016/0283773 A1 | 9/2016 | Popovich et al. |
| 2016/0291328 A1 | 10/2016 | Popovich et al. |
| 2016/0299344 A1 | 10/2016 | Dobschal et al. |
| 2016/0320536 A1 | 11/2016 | Simmonds et al. |
| 2016/0327705 A1 | 11/2016 | Simmonds et al. |
| 2016/0336033 A1 | 11/2016 | Tanaka |
| 2016/0341964 A1 | 11/2016 | Amitai |
| 2017/0003505 A1 | 1/2017 | Vallius et al. |
| 2017/0010466 A1 | 1/2017 | Klug et al. |
| 2017/0010488 A1 | 1/2017 | Klug et al. |
| 2017/0030550 A1 | 2/2017 | Popovich et al. |
| 2017/0031160 A1 | 2/2017 | Popovich et al. |
| 2017/0031171 A1 | 2/2017 | Vallius et al. |
| 2017/0032166 A1 | 2/2017 | Raguin et al. |
| 2017/0034435 A1 | 2/2017 | Vallius |
| 2017/0038579 A1 | 2/2017 | Yeoh et al. |
| 2017/0052374 A1 | 2/2017 | Waldern et al. |
| 2017/0052376 A1 | 2/2017 | Amitai |
| 2017/0059759 A1 | 3/2017 | Ayres et al. |
| 2017/0059775 A1 | 3/2017 | Coles et al. |
| 2017/0102543 A1 | 4/2017 | Vallius |
| 2017/0115487 A1 | 4/2017 | Travis |
| 2017/0123208 A1 | 5/2017 | Vallius |
| 2017/0131460 A1 | 5/2017 | Lin et al. |

FOREIGN PATENT DOCUMENTS

| | | |
|---|---|---|
| CN | 200944140 | 9/2007 |
| CN | 101103297 A | 1/2008 |
| CN | 101151562 A | 3/2008 |
| CN | 101263412 A | 9/2008 |
| CN | 100492099 C | 5/2009 |
| CN | 101589326 A | 11/2009 |
| CN | 101688977 A | 3/2010 |
| CN | 101881936 A | 11/2010 |
| CN | 101945612 A | 1/2011 |
| CN | 102314092 A | 1/2012 |
| CN | 102498425 A | 6/2012 |
| CN | 101793555 B | 10/2012 |
| CN | 102782563 A | 11/2012 |
| CN | 102928981 A | 2/2013 |
| CN | 103777282 A | 5/2014 |
| CN | 103823267 A | 5/2014 |
| CN | 104040308 A | 9/2014 |
| CN | 104204901 A | 12/2014 |
| CN | 105074537 A | 11/2015 |
| CN | 105074539 A | 11/2015 |
| CN | 105190407 A | 12/2015 |
| CN | 105393159 A | 3/2016 |
| CN | 105408801 A | 3/2016 |
| CN | 105408802 A | 3/2016 |
| CN | 105408803 A | 3/2016 |
| CN | 105705981 A | 6/2016 |
| CN | 103562802 B | 8/2016 |
| CN | 104040410 B | 6/2017 |
| CN | 104956252 B | 10/2017 |
| CN | 107466372 A | 12/2017 |
| CN | 108474945 A | 8/2018 |
| CN | 108780224 A | 11/2018 |
| CN | 109154717 A | 1/2019 |
| CN | 105229514 B | 3/2019 |
| CN | 110383117 A | 10/2019 |
| CN | 105531716 B | 1/2020 |
| CN | 111684362 A | 9/2020 |
| CN | 108780224 B | 8/2021 |
| DE | 19751190 A1 | 5/1999 |
| DE | 102006003785 A1 | 7/2007 |
| DE | 102012108424 A1 | 3/2014 |
| DE | 102013209436 A1 | 11/2014 |
| EP | 0795775 A3 | 12/1997 |
| EP | 0822441 A2 | 2/1998 |
| EP | 1347641 A1 | 9/2003 |
| EP | 1413972 A1 | 4/2004 |
| EP | 1526709 A3 | 12/2005 |
| EP | 1938152 A4 | 11/2008 |
| EP | 1748305 A4 | 1/2009 |
| EP | 2110701 A1 | 10/2009 |
| EP | 2225592 A1 | 9/2010 |
| EP | 2244114 A1 | 10/2010 |
| EP | 2326983 A1 | 6/2011 |
| EP | 2381290 A1 | 10/2011 |
| EP | 2494388 A1 | 9/2012 |

(56) References Cited

FOREIGN PATENT DOCUMENTS

| | | |
|---|---|---|
| EP | 1828832 B1 | 5/2013 |
| EP | 2733517 A1 | 5/2014 |
| EP | 1573369 B1 | 7/2014 |
| EP | 2748670 A1 | 7/2014 |
| EP | 2929378 A1 | 10/2015 |
| EP | 2995986 A1 | 3/2016 |
| EP | 3256888 A1 | 12/2017 |
| EP | 3359999 A1 | 8/2018 |
| EP | 3433658 A1 | 1/2019 |
| EP | 3433659 A1 | 1/2019 |
| EP | 3548939 A2 | 10/2019 |
| EP | 3710894 A1 | 9/2020 |
| FR | 2677463 A1 | 12/1992 |
| GB | 2115178 A | 9/1983 |
| GB | 2140935 B | 7/1985 |
| GB | 201000835 | 3/2010 |
| GB | 2508661 A | 6/2014 |
| GB | 2509536 A | 7/2014 |
| GB | 2512077 A | 9/2014 |
| GB | 2514658 A | 12/2014 |
| HK | 1204684 A1 | 11/2015 |
| HK | 1205563 A1 | 12/2015 |
| HK | 1205793 A1 | 12/2015 |
| HK | 1206101 A1 | 12/2015 |
| JP | S5789722 A | 6/1982 |
| JP | H02186319 A | 7/1990 |
| JP | H03239384 A | 10/1991 |
| JP | H06294952 A | 10/1994 |
| JP | H0798439 A | 4/1995 |
| JP | H0990312 A | 4/1997 |
| JP | H1096903 A | 4/1998 |
| JP | H11109320 A | 4/1999 |
| JP | 2953444 B2 | 9/1999 |
| JP | 2000056259 A | 2/2000 |
| JP | 2000511306 A | 8/2000 |
| JP | 2000261706 A | 9/2000 |
| JP | 2000267042 A | 9/2000 |
| JP | 2001027739 | 1/2001 |
| JP | 2001296503 A | 10/2001 |
| JP | 2002090858 A | 3/2002 |
| JP | 2002122906 A | 4/2002 |
| JP | 2002162598 A | 6/2002 |
| JP | 2002523802 A | 7/2002 |
| JP | 2002529790 A | 9/2002 |
| JP | 2002311379 A | 10/2002 |
| JP | H11142806 B | 10/2002 |
| JP | 2003066428 A | 3/2003 |
| JP | 2003270419 A | 9/2003 |
| JP | 2004157245 A | 6/2004 |
| JP | 2006350129 A | 12/2006 |
| JP | 2007011057 A | 1/2007 |
| JP | 2007094175 A | 4/2007 |
| JP | 2007219106 A | 8/2007 |
| JP | 2008112187 A | 5/2008 |
| JP | 2009036955 A | 2/2009 |
| JP | 2009132221 A | 6/2009 |
| JP | 2009133999 A | 6/2009 |
| JP | 2009211091 A | 9/2009 |
| JP | 4367775 B2 | 11/2009 |
| JP | 2012137616 A | 7/2012 |
| JP | 2012533089 A | 12/2012 |
| JP | 5303928 B2 | 10/2013 |
| JP | 2013235256 A | 11/2013 |
| JP | 2014132328 A | 7/2014 |
| JP | 2015523586 A | 8/2015 |
| JP | 2015172713 A | 10/2015 |
| JP | 2016030503 A | 3/2016 |
| JP | 2018508037 A | 3/2018 |
| JP | 2018533069 A | 11/2018 |
| JP | 2019512745 A | 5/2019 |
| JP | 2019520595 A | 7/2019 |
| JP | 6598269 B2 | 10/2019 |
| JP | 6734933 B2 | 8/2020 |
| JP | 2021509736 A | 4/2021 |
| JP | 6895451 B2 | 6/2021 |
| KR | 20060132474 A | 12/2006 |
| KR | 20100092059 A | 8/2010 |
| KR | 20140140063 A | 12/2014 |
| KR | 20140142337 A | 12/2014 |
| KR | 1020200106932 A | 9/2020 |
| TW | 200535633 A | 11/2005 |
| TW | 200801583 A | 1/2008 |
| TW | 201314263 A | 4/2013 |
| TW | 201600943 A | 1/2016 |
| TW | 201604601 A | 2/2016 |
| WO | WO-2011042711 A2 * | 4/2011 ............ G01J 3/1895 |
| WO | 2011051660 A1 | 5/2011 |
| WO | 2011055109 A2 | 5/2011 |

OTHER PUBLICATIONS

U.S. Appl. No. 61/457,835, filed Jun. 16, 2011, Popovich.
U.S. Appl. No. 61/573,066, filed Aug. 24, 2011.
Dhar et al., "Recording media that exhibit high dynamic range for digital holographic data storage", Optics Letters, Apr. 1, 1999, vol. 24, No. 7, pp. 487-489.
Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.
Drake et al., "Waveguide Hologram Fingerprint Entry Device", Optical Engineering, Sep. 1996, vol. 35, No. 9, pp. 2499-2505.
Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537].
Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212.
Ducharme, "Microlens diffusers for efficient laser speckle generation", Optics Express, Oct. 29, 2007, vol. 15, No. 22, pp. 14573-14579.
Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.
Extended European Search Report for EP Application No. 13192383.1, dated Apr. 2, 2014, 7 pgs.
Extended European Search Report for European Application No. 13765610.4 dated Feb. 16, 2016, 6 pgs.
Extended European Search Report for European Application No. 15187491.4, search completed Jan. 15, 2016, dated Jan. 28, 2016, 5 pgs.
Fattal et al., "A multi directional backlight for a wide-angle glasses-free three-dimensional display", Nature, Mar. 21, 2012, vol. 495, pp. 348-351.
Fontecchio et al., "Spatially Pixelated Reflective Arrays from Holographic Polymer Dispersed Liquid Crystals", SID 00 Digest, May 2000, pp. 774-776.
Forman et al., "Materials development for PhotoINhibited Super-Resolution (PINSR) lithography", Proc. of SPIE, 2012, vol. 8249, pp. 824904-1-824904-9, doi: 10.1117/12.908512.
Forman et al., "Radical diffusion limits to photoinhibited super-resolution lithography", Phys. Chem. Chem. Phys., May 31, 2013, vol. 15, pp. 14862-14867.
Friedrich-Schiller, "Spatial Noise and Speckle", Version 1.12.2011, Dec. 2011, Abbe School of Photonics, Jena, Germany, 27 pgs.
Fuh et al., "Thermally and Electrically Switchable Gratings Based Upon the Polymer-Balls Type Polymer-Dispersed Liquid Crystal Films", Appl. Phys. vol. 41, No. 22, Aug. 1, 2002, pp. 4585-4589.
Fujii et al., "Nanoparticle-polymer-composite volume gratings incorporating chain-transfer agents for holography and slow-neutron optics", Optics Letters, Apr. 25, 2014, vol. 39, Issue 12, 5 pgs.
Funayama et al., "Proposal of a new type thin film light waveguide display device using", The International Conference on Electrical Engineering, 2008, No. P-044, 5 pgs.

(56) References Cited

OTHER PUBLICATIONS

Gabor, "Laser Speckle and its Elimination", BM Research and Development, Eliminating Speckle Noise, Sep. 1970, vol. 14, No. 5, pp. 509-514.
Gardiner et al., "Bistable liquid-crystals reduce power consumption for high-efficiency smart glazing", SPIE, 2009, 10.1117/2.1200904. 1596, 2 pgs.
Gerritsen et al., "Application of Kogelnik's two-wave theory to deep, slanted, highly efficient, relief transmission gratings", Applied Optics, Mar. 1, 1991, vol. 30; No. 7, pp. 807-814.
Giancola, "Holographic Diffuser, Makes Light Work of Screen Tests", Photonics Spectra, 1996, vol. 30, No. 8, pp. 121-122.
Golub et al., "Bragg properties of efficient surface relief gratings in the resonance domain", Optics Communications, Feb. 24, 2004, vol. 235, pp. 261-267, doi: 10.1016/j.optcom.2004.02.069.
Goodman et al., "Speckle Reduction by a Moving Diffuser in Laser Projection Displays", The Optical Society of America, 2000, 15 pgs.
Goodman, "Some fundamental properties of speckle", J. Opt. Soc. Am., Nov. 1976, vol. 66, No. 11, pp. 1145-1150.
Goodman, "Statistical Properties of Laser Speckle Patterns", Applied Physics, 1975, vol. 9, Chapter 2, Laser Speckle and Related Phenomena, pp. 9-75.
Guldin et al., "Self-Cleaning Antireflective Optical Coatings", Nano Letters, Oct. 14, 2013, vol. 13, pp. 5329-5335.
Guo et al., "Review Article: A Review of the Optimisation of Photopolymer Materials for Holographic Data Storage", Physics Research International, vol. 2012, Article ID 803439, Academic Editor: Sergi Gallego, 16 pages, http://dx.doi.org/10.1155/2012/803439, May 4, 2012.
Han et al., "Study of Holographic Waveguide Display System", Advanced Photonics for Communications, 2014, 4 pgs.
Harbers et al., "I-15.3: Led Backlighting for LCD-HDTV", Journal of the Society for Information Display, 2002, vol. 10, No. 4, pp. 347-350.
Harbers et al., "Performance of High Power LED Illuminators in Color Sequential Projection Displays", Lumileds lighting, 2007, 4 pgs.
Harbers et al., "Performance of High Power LED Illuminators in Color Sequential Projection Displays", Lumileds, Aug. 7, 2001, 11 pgs.
Harbers et al., "Performance of High-Power LED illuminators in Projection Displays", Proc. Int. Disp. Workshops, Japan. vol. 10, pp. 1585-1588, 2003.
Harding et al., "Reactive Liquid Crystal Materials for Optically Anisotropic Patterned Retarders", Merck, Iicrivue, 2008, ME-GR-RH-08-010, 20 pgs.
Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.
Hariharan, "Optical Holography: Principles, techniques and applications", Cambridge University Press, 1996, pp. 231-233.
Harris, "Photonic Devices", EE 216 Principals and Models of Semiconductor Devices, Autumn 2002, 20 pgs.
Harrold et al., "3D Display Systems Hardware Research at Sharp Laboratories of Europe: an update", Sharp Laboratories of Europe, Ltd., 7 pgs.
Harthong et al., "Speckle phase averaging in high-resolution color holography", J. Opt. Soc. Am. A, Feb. 1997, vol. 14, No. 2, pp. 405-409.
Hasan et al., "Tunable-focus lens for adaptive eyeglasses", Optics Express, Jan. 23, 2017, vol. 25, No. 2, 1221, 13 pgs.
Hasman et al., "Diffractive Optics: Design, Realization, and Applications", Fiber and Integrated Optics, vol. 16, pp. 1-25, 1997.
Hata et al., "Holographic nanoparticle-polymer composites based on step-growth thiol-ene photopolymerization", Optical Materials Express, Jun. 1, 2011, vol. 1, No. 2, pp. 207-222.
He et al., "Dynamics of peristrophic multiplexing in holographic polymer-dispersed liquid crystal", Liquid Crystals, Mar. 26, 2014, vol. 41, No. 5, pp. 673-684.
He et al., "Holographic 3D display based on polymer-dispersed liquid-crystal thin films", Proceedings of China Display/Asia Display 2011, pp. 158-160.
He et al., "Properties of Volume Holograms Recording in Photopolymer Films with Various Pulse Exposures Repetition Frequencies", Proceedings of SPIE vol. 5636, Bellingham, WA, 2005, doi: 10.1117/12.580978, pp. 842-848.
Herman et al., "Production and Uses of Diffractionless Beams", J. Opt. Soc. Am. A., Jun. 1991, vol. 8, No. 6, pp. 932-942.
Hisano, "Alignment layer-free molecular ordering induced by masked photopolymerization with nonpolarized light", Appl. Phys. Express 9, Jun. 6, 2016, pp. 072601-1-072601-4.
Hoepfner et al., "LED Front Projection Goes Mainstream", Luminus Devices, Inc., Projection Summit, 2008, 18 pgs.
Holmes et al., "Controlling the Anisotropy of Holographic Polymer-Dispersed Liquid-Crystal Gratings", Physical Review E, Jun. 11, 2002, vol. 65, 066603-1-066603-4.
Hoyle et al., "Advances in the Polymerization of Thiol-Ene Formulations", Heraeus Noblelight Fusion UV Inc., 2003 Conference, 6 pgs.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.
"Application Note AN16: Optical Considerations for Bridgelux LED Arrays", BridgeLux, Jul. 31, 2010, 23 pgs.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc., info@bnonlinear.com, May 8, 2001, 4 pgs.
"BragGrate—Deflector: Transmitting Volume Bragg Grating for angular selection and magnification", 2015, www.OptiGrate.com.
"Cree XLamp XP-E LEDs", Cree, Inc., Retrieved from www.cree.com/Xlamp, CLD-DS18 Rev 17, 2013, 17 pgs.
"Desmodur N 3900", Bayer MaterialScience AG, Mar. 18, 2013, www.bayercoatings.com, 4 pgs.
"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., pp. 233-261.
"FHS Lenses Series", Fraen Corporation, www.fraen.com, Jun. 16, 2003, 10 pgs.
"FLP Lens Series for LUXEONTM Rebel and Rebel ES LEDs", Fraen Corporation, www.fraensrl.com, Aug. 7, 2015, 8 pgs.
"Head-up Displays, See-through display for military aviation", BAE Systems, 2016, 3 pgs.
"Holder for LUXEON Rebel—Part No. 180", Polymer Optics Ltd., 2008, 12 pgs.
"LED 7-Segment Displays", Lumex, uk.digikey.com, 2003, UK031, 36 pgs.
"LED325W UVTOP UV LED with Window", Thorlabs, Specifications and Documentation, 21978-S01 Rev. A, Apr. 8, 2011, 5 pgs.
"Liquid Crystal Phases", Phases of Liquid Crystals, http://plc.cwru.edu/tutorial/enhanced/files/lc/phase, Retrieved on Sep. 21, 2004, 6 pgs.
"LiteHUD Head-up display infographic", BAE Systems, 2017, 2 pgs.
"LiteHUD Head-up display", BAE Systems, 2016, 2 pgs.
"Luxeon C: Power Light Source", Philips Lumileds, www.philipslumileds.com, 2012, 18 pgs.
"Luxeon Rebel ES: Leading efficacy and light output, maximum design flexibility", LUXEON Rebel ES Datasheet DS6120130221, www.philipslumileds.com, 2013, 33 pgs.
"Mobile Display Report", Insight Media, LLC, Apr. 2012, vol. 7, No. 4, 72 pgs.

(56) References Cited

OTHER PUBLICATIONS

"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.
"Navy awards SGB Labs a contract for HMDs for simulation and training", Press releases, DigiLens, Oct. 2012, pp. 1-2.
"Optical measurements of retinal flow", Industrial Research Limited, Feb. 2012, 18 pgs.
"Osterhout Design Group Develops Next-Generation, Fully-integrated Smart Glasses Using Qualcomm Technologies", ODG, www.osterhoutgroup.com, Sep. 18, 2014, 2 pgs.
"Plastic has replaced glass in photochromic lens", www.plastemart.com, 2003, 1 page.
"Range Finding Using Pulse Lasers", OSRAM, Opto Semiconductors, Sep. 10, 2004, 7 pgs.
"Response time in Liquid Crystal Variable Retarders", Meadowlark Optics, Inc., 2005, 4 pgs.
"Secondary Optics Design Considerations for SuperFlux LEDs", Lumileds, application brief AB20-5, Sep. 2002, 23 pgs.
"Solid-State Optical Mouse Sensor with Quadrature Outputs", IC Datasheet, UniqueICs, Jul. 15, 2004, 11 pgs.
"SVGA TransparentVLSITM Microdisplay Evaluation Kit", Radiant Images, Inc., Product Data Sheet, 2003, 3 pgs.
"Technical Data Sheet LPR1", Luminus Devices, Inc., Luminus Projection Chipset, Release 1, Preliminary, Revision B, Sep. 21, 2004, 9 pgs.
"The Next Generation of TV", SID Information Display, Nov./Dec. 2014, vol. 30, No. 6, 56 pgs.
"Thermal Management Considerations for SuperFlux LEDs", Lumileds, application brief AB20-4, Sep. 2002, 14 pgs.
"USAF Awards SBG Labs an SBIR Contract for Wide Field of View HUD", Press Release , SBG Labs DigiLens, Apr. 2014, 2 pgs.
"UVTOP240", Roithner LaserTechnik GmbH, v 2.0, Jun. 24, 2013, 6 pgs.
"UVTOP310", Roithner LaserTechnik GmbH, v 2.0, Jun. 24, 2013, 6 pgs.
"Velodyne's HDL-64E: A High Definition Lidar Sensor for 3-D Applications", High Definition Lidar, white paper, Oct. 2007, 7 pgs.
"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.
"Webster's Third New International Dictionary 433", (1986), 3 pages.
"X-Cubes—Revisited for LCOS", BASID, RAF Electronics Corp. Rawson Optics, Inc., Oct. 24, 2002, 16 pgs.
Aachen, "Design of plastic optics for LED applications", Optics Colloquium 2009, Mar. 19, 2009, 30 pgs.
Abbate et al., "Characterization of LC-polymer composites for opto-electronic application", Proceedings of OPTOEL'03, Leganes-Madrid, Spain, Jul. 14-16, 2003, 4 pgs.
Al-Kalbani et al., "Ocular Microtremor laser speckle metrology", Proc. of SPIE, 2009, vol. 7176 717606-1, 12 pgs.
Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.
Amitai et al., "Visor-display design based on planar holographic optics", Applied Optics, vol. 34, No. 8, Mar. 10, 1995, pp. 1352-1356.
Amundson et al., "Morphology and electro-optic properties of polymer-dispersed liquid crystal films", Physical Review E, Feb. 1997, vol. 55. No. 2, pp. 1646-1654.
An et al., "Speckle suppression in laser display using several partially coherent beams", Optics Express, Jan. 5, 2009, vol. 17, No. 1, pp. 92-103.
Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.
Huang et al., "Diffraction properties of substrate guided-wave holograms", Optical Engineering, Oct. 1995, vol. 34, No. 10, pp. 2891-2899.
Huang et al., "Theory and characteristics of holographic polymer dispersed liquid crystal transmission grating with scaffolding morphology", Applied Optics, Jun. 20, 2012, vol. 51, No. 18, pp. 4013-4020.
Iannacchione et al., "Deuterium NMR and morphology study of copolymer-dispersed liquid-crystal Bragg gratings", Europhysics Letters, 1996, vol. 36, No. 6, pp. 425-430.
International Preliminary Report on Patentability for International Application No. PCT/GB2010/000835, dated Nov. 1, 2011, dated Nov. 10, 2011, 9 pgs.
International Preliminary Report on Patentability for International Application No. PCT/GB2010/001920, dated Apr. 11, 2012, dated Apr. 19, 2012, 10 pgs.
International Preliminary Report on Patentability for International Application No. PCT/GB2010/001982, report dated May 1, 2012, dated May 10, 2012, 7 pgs.
International Preliminary Report on Patentability for International Application No. PCT/GB2013/000273, dated Dec. 23, 2014, dated Dec. 31, 2014, 8 pgs.
International Preliminary Report on Patentability for International Application No. PCT/GB2015/000203, dated Mar. 21, 2017, dated Mar. 30, 2017, 8 pgs.
International Preliminary Report on Patentability for International Application No. PCT/GB2016/000036, dated Aug. 29, 2017, dated Sep. 8, 2017, 8 pgs.
International Preliminary Report on Patentability for International Application No. PCT/GB2016/000051, Report dated Sep. 19, 2017, dated Sep. 28, 2017, 7 Pgs.
International Preliminary Report on Patentability for International Application No. PCT/GB2016/000065, dated Oct. 3, 2017, dated Oct. 12, 2017, 8 pgs.
International Preliminary Report on Patentability for International Application No. PCT/US2018/012227, Report dated Jul. 30, 2019, dated Aug. 8, 2019, 7 Pgs.
International Preliminary Report on Patentability for International Application No. PCT/US2019/012758, Report dated Jul. 14, 2020, dated Jul. 23, 2020, 4 Pgs.
International Preliminary Report on Patentability for International Application No. PCT/US2019/012759, Report dated Jul. 14, 2020, dated Jul. 23, 2020, 6 Pgs.
International Preliminary Report on Patentability for International Application PCT /US2018/015553, Report dated Jun. 4, 2019, dated Jun. 13, 2019, 6 Pgs.
International Preliminary Report on Patentability for International Application PCT/GB2009/051676, dated Jun. 14, 2011, dated Jun. 23, 2011, 6 pgs.
International Preliminary Report on Patentability for International Application PCT/GB2011/000349, dated Sep. 18, 2012, dated Sep. 27, 2012, 10 pgs.
International Preliminary Report on Patentability for International Application PCT/GB2012/000331, dated Oct. 8, 2013. dated Oct. 17, 2013, 8 pgs.
International Preliminary Report on Patentability for International Application PCT/GB2012/000677, dated Feb. 25, 2014, dated Mar. 6, 2014, 5 pgs.
International Preliminary Report on Patentability for International Application PCT/GB2013/000005, dated Jul. 8, 2014, dated Jul. 17, 2014, 12 pgs.
International Preliminary Report on Patentability for International Application PCT/GB2014/000295, dated Feb. 2, 2016, dated Feb. 11, 2016, 4 pgs.
International Preliminary Report on Patentability for International Application PCT/GB2015/000225, dated Feb. 14, 2017, dated Feb. 23, 2017, 8 pgs.
International Preliminary Report on Patentability for International Application PCT/GB2015/000228, dated Feb. 14, 2017, dated Feb. 23, 2017, 11 pgs.

(56) References Cited

OTHER PUBLICATIONS

International Preliminary Report on Patentability for International Application PCT/GB2015/000274, dated Mar. 28, 2017, dated Apr. 6, 2017, 8 pgs.
International Preliminary Report on Patentability for International Application PCT/GB2016/000014, dated Jul. 25, 2017, dated Aug. 3, 2017, 7 pgs.
International Preliminary Report on Patentability for International Application PCT/GB2017/000040, Report dated Sep. 25, 2018, dated Oct. 4, 2018, 7 pgs.
International Preliminary Report on Patentability for International Application PCT/GB2017/000055, dated Oct. 16, 2018, dated Oct. 25, 2018, 9 pgs.
International Preliminary Report on Patentability for International Application PCT/US2014/011736, dated Jul. 21, 2015, dated Jul. 30, 2015, 9 pgs.
International Preliminary Report on Patentability for International Application PCT/US2016/017091, dated Aug. 15, 2017, dated Aug. 24, 2017, 5 pgs.
International Preliminary Report on Patentability for International Application PCT/US2018/012691, dated Jul. 9, 2019, dated Jul. 18, 2019, 10 pgs.
International Preliminary Report on Patentability for International Application PCT/US2019/012764, Report dated Jul. 14, 2020, dated Jul. 23, 2020, 5 Pgs.
International Preliminary Report on Patentability for PCT Application No. PCT/US2013/038070, dated Oct. 28, 2014, 6 pgs.
International Search Report and Written Opinion for International Application No. PCT/GB2010/000835, completed Oct. 26, 2010, dated Nov. 8, 2010, 12 pgs.
International Search Report and Written Opinion for International Application No. PCT/GB2010/001920, completed Mar. 29, 2011, dated Apr. 6, 2011, 15 pgs.
International Search Report and Written Opinion for International Application No. PCT/GB2015/000228, Search completed May 4, 2011, dated Jul. 15, 2011, 15 Pgs.
International Search Report and Written Opinion for International Application No. PCT/GB2016/000036, completed Jul. 4, 2016, dated Jul. 13, 2016, 10 pgs.
International Search Report and Written Opinion for International Application No. PCT/GB2016/000065, completed Jul. 14, 2016, dated Jul. 27, 2016, 10 pgs.
International Search Report and Written Opinion for International Application No. PCT/GB2017/000055, Search completed Jul. 19, 2017, dated Jul. 26, 2017, 12 pgs.
International Search Report and Written Opinion for International Application No. PCT/US2013/038070, completed Aug. 12, 2013, dated Aug. 14, 2013, 12 pgs.
International Search Report and Written Opinion for International Application No. PCT/US2014/011736, completed Apr. 18, 2014, dated May 8, 2014, 10 pgs.
International Search Report and Written Opinion for International Application No. PCT/US2018/012227, Search completed Feb. 28, 2018, dated Mar. 14, 2018, 8 Pgs.
International Search Report and Written Opinion for International Application No. PCT/US2018/012691, completed Mar. 10, 2018, dated Mar. 28, 2018, 16 pgs.
International Search Report and Written Opinion for International Application No. PCT/US2018/015553, completed Aug. 6, 2018, dated Sep. 19, 2018, 12 pgs.
International Search Report and Written Opinion for International Application No. PCT/US2018/037410, Search completed Aug. 16, 2018, dated Aug. 30, 2018, 11 Pgs.
International Search Report and Written Opinion for International Application No. PCT/US2018/048636, Search completed Nov. 1, 2018, dated Nov. 5, 2018, 16 Pgs.
International Search Report and Written Opinion for International Application No. PCT/US2018/048960, Search completed Dec. 14, 2018, dated Jan. 8, 2019, 14 Pgs.
International Search Report and Written Opinion for International Application No. PCT/US2018/056150, Search completed Dec. 4, 2018, dated Dec. 26, 2018, 10 Pgs.
International Search Report and Written Opinion for International Application No. PCT/US2018/062835, Search completed Jan. 14, 2019, dated Jan. 31, 2019, 14 Pgs.
International Search Report and Written Opinion for International Application No. PCT/US2019/012758, completed Mar. 12, 2019, dated Mar. 27, 2019, 9 pgs.
Ramsey, "Holographic Patterning of Polymer Dispersed Liquid Crystal Materials for Diffractive Optical Elements", Thesis, The University of Texas at Arlington, Dec. 2006, 166 pgs.
Reid, "Thin film silica nanocomposites for anti-reflection coatings", Oxford Advance Surfaces, www.oxfordsurfaces.com, Oct. 18, 2012, 23 pgs.
Riechert, "Speckle Reduction in Projection Systems", Dissertation, University Karlsruhe, 2009, 178 pgs.
Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.
Sagan et al., "Electrically Switchable Bragg Grating Technology for Projection Displays", Proc. SPIE. vol 4294, Jan. 24, 2001, pp. 75-83.
Saleh et al., "Fourier Optics: 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.
Saraswat, "Deposition & Planarization", EE 311 Notes, Aug. 29, 2017, 28 pgs.
Schechter et al., "Compact beam expander with linear gratings", Applied Optics, vol. 41, No. 7, Mar. 1, 2002, pp. 1236-1240.
Schreiber et al., "Laser display with single-mirror MEMS scanner", Journal of the SID 17/7, 2009, pp. 591-595.
Seiberle et al., "Photo-aligned anisotropic optical thin films", Journal of the SID 12/1, 2004, 6 pgs.
Serebriakov et al., "Correction of the phase retardation caused by intrinsic birefringence in deep UV lithography", Proc. of SPIE, May 21, 2010, vol. 5754, pp. 1780-1791.
Shi et al., "Design considerations for high efficiency liquid crystal decentered microlens arrays for steering light", Applied Optics, vol. 49, No. 3, Jan. 20, 2010, pp. 409-421.
Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.
Simonite, "How Magic Leap's Augmented Reality Works", Intelligent Machines, Oct. 23, 2014, 7 pgs.
Smith et al., "RM-PLUS—Overview", Licrivue, Nov. 5, 2013, 16 pgs.
Sony Global, "Sony Releases the Transparent Lens Eyewear 'SmartEyeglass Developer Edition'", printed Oct. 19, 2017, Sony Global—News Releases, 5 pgs.
Steranka et al., "High-Power LEDs—Technology Status and Market Applications", Lumileds, Jul. 2002, 23 pgs.
Stumpe et al., "Active and Passive LC Based Polarization Elements", Mol. Cryst. Liq. Cryst., 2014, vol. 594: pp. 140-149.
Stumpe et al., "New type of polymer-LC electrically switchable diffractive devices—POLIPHEM", May 19, 2015, p. 97.
Subbarayappa et al., "Bistable Nematic Liquid Crystal Device", Jul. 30, 2009, 14 pgs.
Sun et al., "Effects of multiwalled carbon nanotube on holographic polymer dispersed liquid crystal", Polymers Advanced Technologies, Feb. 19, 2010, DOI: 10.1002/pat.1708, 8 pgs.
Sun et al., "Low-birefringence lens design for polarization sensitive optical systems", Proceedings of SPIE, 2006, vol. 6289, doi: 10.1117/12.679416, pp. 6289DH-1-6289DH-10.
Sun et al., "Transflective multiplexing of holographic polymer dispersed liquid crystal using Si additives", eXPRESS Polymer Letters, 2011, vol. 5, No. 1, pp. 73-81.
Sutherland et al., "Bragg Gratings in an Acrylate Polymer Consisting of Periodic Polymer—Dispersed Liquid-Crystal Planes", Chem. Mater., 1993, vol. 5, pp. 1533-1538.

(56) References Cited

OTHER PUBLICATIONS

Sutherland et al., "Electrically switchable vol. gratings in polymer-dispersed liquid crystals", Applied Physics Letters, Feb. 28, 1994, vol. 64, No. 9, pp. 1074-1076.
Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.
Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.
Sutherland et al., "The physics of photopolymer liquid crystal composite holographic gratings", presented at SPIE: Diffractive and Holographic Optics Technology San Jose, CA, 1996, SPIE, vol. 2689, pp. 158-169.
Sweatt, "Achromatic triplet using holographic optical elements", Applied Optics, May 1977, vol. 16, No. 5, pp. 1390-1391.
Talukdar, "Technology Forecast: Augmented reality", Changing the economics of Smartglasses, Issue 2, 2016, 5 pgs.
Tao et al., "TiO2 nanocomposites with high refractive index and transparency", J. Mater. Chem., Oct. 4, 2011, vol. 21, pp. 18623-18629.
Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.
Tiziani, "Physical Properties of Speckles", Speckle Metrology, Chapter 2, Academic Press, Inc., 1978, pp. 5-9.
Tominaga et al., "Fabrication of holographic polymer dispersed liquid crystals doped with gold nanoparticles", 2010 Japanese Liquid Crystal Society Annual Meeting, 2 pgs.
Tomita, "Holographic assembly of nanoparticles in photopolymers for photonic applications", The International Society for Optical Engineering, SPIE Newsroom, 2006, 10.1117/2.1200612.0475, 3 pgs.
Tondiglia et al., "Holographic Formation of Electro-Optical Polymer-Liquid Crystal Photonic Crystals", Advanced Materials, 2002, Published Online Nov. 8, 2001, vol. 14, No. 3, pp. 187-191.
Trisnadi, "Hadamard Speckle Contrast Reduction", Optics Letters, Jan. 1, 2004, vol. 29, No. 1, pp. 11-13.
Trisnadi, "Speckle contrast reduction in laser projection displays", Proc. SPIE 4657, 2002, 7 pgs.
Tzeng et al., "Axially symmetric polarization converters based on photo-aligned liquid crystal films", Optics Express, Mar. 17, 2008, vol. 16, No. 6, pp. 3768-3775.
Upatnieks et al., "Color Holograms for white light reconstruction", Applied Physics Letters, Jun. 1, 1996, vol. 8, No. 11, pp. 286-287.
Urey, "Diffractive exit pupil expander for display applications", Applied Optics, vol. 40, Issue 32, pp. 5840-5851 (2001).
International Search Report and Written Opinion for International Application No. PCT/US2019/012764, completed Mar. 1, 2019, dated Mar. 18, 2019, 9 pgs.
International Search Report and Written Opinion for International Application No. PCT/US2019/031163, Search completed Jul. 9, 2019, dated Jul. 29, 2019, 11 Pgs.
International Search Report and Written Opinion for International Application No. PCT/US2019/043496, Search completed Sep. 28, 2019, dated Nov. 14, 2019, 12 Pgs.
International Search Report and Written Opinion for International Application No. PCT/US2020/031363, completed May 28, 2020, dated Jun. 10, 2020, 8 Pgs.
International Search Report and Written Opinion for International Application PCT/GB2009/051676, completed May 10. 2010, dated May 18, 2010, 7 pgs.
International Search Report and Written Opinion for International Application PCT/GB2016/000181, completed Dec. 21, 2016, dated Feb. 27, 2017, 21 pgs.
International Search Report and Written Opinion for International Application PCT/US2016/017091, completed by the European Patent Office dated Apr. 20, 2016, 7 pgs.
International Search Report and Written Opinion for International Application PCT/US2019/012759, completed Mar. 14, 2019, dated Apr. 15, 2019, 12 pgs.
International Search Report for International Application No. PCT/GB2014/000295, completed Nov. 18, 2014, dated Jan. 5, 2015, 4 pgs.
International Search Report for International Application PCT/GB2017/000040, dated Jul. 18, 2017, completed Jul. 10, 2017, 3 pgs.
International Search Report for PCT/GB2010/001982, completed by the European Patent Office dated Feb. 24, 2011, 4 pgs.
International Search Report for PCT/GB2011/000349, completed by the European Patent Office dated Aug. 17, 2011, 4 pgs.
International Search Report for PCT/GB2012/000331, completed by the European Patent Office dated Aug. 29, 2012, 4 pgs.
International Search Report for PCT/GB2012/000677, completed by the European Patent Office dated Dec. 10, 2012, 4 pgs.
International Search Report for PCT/GB2013/000005, completed by the European Patent Office dated Jul. 16, 2013, 3 pgs.
International Search Report for PCT/GB2013/000273, completed by the European Patent Office dated Aug. 30, 2013, 4 pgs.
International Search Report for PCT/GB2015/000203, completed by the European Patent Office dated Oct. 9, 2015, 4 pgs.
International Search Report for PCT/GB2015/000225, completed by the European Patent Office dated Nov. 10, 2015, dated Dec. 2, 2016, 5 pgs.
International Search Report for PCT/GB2015/000274, completed by the European Patent Office dated Jan. 7, 2016, 4 pgs.
International Search Report for PCT/GB2016/000014, completed by the European Patent Office dated Jun. 27, 2016, 4 pgs.
International Search Report for PCT/GB2016/000051, Completed Aug. 11, 2016, 3 Pgs.
Irie, "Photochromic diarylethenes for photonic devices", Pure and Applied Chemistry, 1996, pp. 1367-1371, vol. 68, No. 7, IUPAC.
Jeng et al., "Aligning liquid crystal molecules", SPIE, 2012, 10.1117/2.1201203.004148, 2 pgs.
Jeong et al., "Memory Effect of Polymer Dispersed Liquid Crystal by Hybridization with Nanoclay", express Polymer Letters, vol. 4, No. 1, 2010, pp. 39-46.
Jo et al., "Control of Liquid Crystal Pretilt Angle using Polymerization of Reactive Mesogen", IMID 2009 Digest, P1-25, 2009, pp. 604-606.
Juhl et al., "Holographically Directed Assembly of Polymer Nanocomposites", ACS Nano, Oct. 7, 2010, vol. 4, No. 10, pp. 5953-5961.
Juhl, "Interference Lithography for Optical Devices and Coatings", Dissertation, University of Illinois at Urbana- Champaign, 2010.
Jurbergs et al., "New recording materials for the holographic industry", Proc. of SPIE, 2009 vol. 7233, pp. 72330K-1-72330L-10, doi: 10.1117/12.809579.
Kahn et al., "Private Line Report on Large Area Display", Kahn International, Jan. 7, 2003, vol. 8, No. 10, 9 pgs.
Karasawa et al., "Effects of Material Systems on the Polarization Behavior of Holographic Polymer Dispersed liquid Crystal Gratings", Japanese Journal of Applied Physics, Oct. 1997, vol. 36, No. 10, pp. 6388-6392.
Karp et al., "Planar micro-optic solar concentration using multiple imaging lenses into a common slab waveguide", Proc. of SPIE vol. 7407, 2009 SPIE, CCC code: 0277-786X/09, doi: 10.1117/12.826531, pp. 74070D-1-74070D-11.
Karp et al., "Planar micro-optic solar concentrator", Optics Express, Jan. 18, 2010, vol. 18, No. 2, pp. 1122-1133.
Kato et al., "Alignment-Controlled Holographic Polymer Dispersed Liquid Crystal (HPDLC) for Reflective Display Devices", SPIE, 1998, vol. 3297, pp. 52-57.
Kessler, "Optics of Near to Eye Displays (NEDs)", Oasis 2013, Tel Aviv, Feb. 19, 2013, 37 pgs.
Keuper et al., "26.1: RGB LED Illuminator for Pocket-Sized Projectors", SID 04 Digest, 2004, ISSN/0004-0966X/04/3502, pp. 943-945.
Keuper et al., "P-126: Ultra-Compact LED based Image Projector for Portable Applications", SID 03 DIGEST, 2003, ISSN/0003-0966X/03/3401-0713, pp. 713-715.

(56) References Cited

OTHER PUBLICATIONS

Kim et al., "Effect of Polymer Structure on the Morphology and Electro optic Properties of UV Curable PNLCs", Polymer, Feb. 2000, vol. 41, pp. 1325-1335.
Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.
Kim et al., "Fabrication of Reflective Holographic PDLC for Blue", Molecular Crystals and Liquid Crystals Science, 2001, vol. 368, pp. 3845-3853.
Kim et al., "Optimization of Holographic PDLC for Green", Mol. Cryst. Liq. Cryst., vol. 368, pp. 3855-3864, 2001.
Klein, "Optical Efficiency for Different Liquid Crystal Colour Displays", Digital Media Department, HPL-2000-83, Jun. 29, 2000, 18 pgs.
Kogelnik, "Coupled Wave Theory for Thick Hologram Gratings", The Bell System Technical Journal, vol. 48, No. 9, pp. 2909-2945, Nov. 1969.
Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.
Kress et al., "Diffractive and Holographic Optics as Optical Combiners in Head Mounted Displays", UbiComp '13, Sep. 9-12, 2013, Session: Wearable Systems for Industrial Augmented Reality Applications, pp. 1479-1482.
Lauret et al., "Solving the Optics Equation for Effective LED Applications", Gaggione North America, LLFY System Design Workshop 2010, Oct. 28, 2010, 26 pgs.
Lee, "Patents Shows Widespread Augmented Reality Innovation", PatentVue, May 26, 2015, 5 pgs.
Levola et al., "Near-to-eye display with diffractive exit pupil expander having chevron design", Journal of the SID, 2008, 16/8, pp. 857-862.
Levola et al., "Replicated slanted gratings with a high refractive index material for in and outcoupling of light", Optics Express, vol. 15, Issue 5, pp. 2067-2074 (2007).
Levola, "Diffractive optics for virtual reality displays", Journal of the SID, 2006, 14/5, pp. 467-475.
Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.
Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243.
Arnold et al., "52.3: An Improved Polarizing Beamsplitter LCOS Projection Display Based on Wire-Grid Polarizers", Society for Information Display, Jun. 2001, pp. 1282-1285.
Ayras et al., "Exit pupil expander with a large field of view based on diffractive optics", Journal of the SID, May 18, 2009, 17/8, pp. 659-664.
Baets et al., "Resonant-Cavity Light-Emitting Diodes: a review", Proceedings of SPIE, 2003, vol. 4996, pp. 74-86.
Bayer et al., "Introduction to Helmet-Mounted Displays", 2016, pp. 47-108.
Beckel et al., "Electro-optic properties of thiol-ene polymer stabilized ferroelectric liquid crystals", Liquid Crystals, vol. 30, No. 11, Nov. 2003, pp. 1343-1350, DOI: 10.1080/02678290310001605910.
Bergkvist, "Biospeckle-based Study of the Line Profile of Light Scattered in Strawberries", Master Thesis, Lund Reports on Atomic Physics, LRAP-220, Lund 1997, pp. 1-62.
Bernards et al., "Nanoscale porosity in polymer films: fabrication and therapeutic applications", Soft Matter, Jan. 1, 2010, vol. 6, No. 8, pp. 1621-1631, doi:10.1039/B922303G.
Bleha et al., "Binocular Holographic Waveguide Visor Display", SID Symposium Digest of Technical Papers, Holoeye Systems Inc., Jun. 2014, San Diego, CA, 4 pgs.
Bleha et al., "D-ILA Technology for High Resolution Projection Displays", Sep. 10, 2003, Proceedings, vol. 5080, doi:10.1117/12.497532, 11 pgs.
Bone, "Design Obstacles for LCOS Displays in Projection Applications "Optics architectures for LCOS are still evolving"", Aurora Systems Inc., Bay Area SID Seminar, Mar. 27, 2001, 22 pgs.
Born et al., "Optics of Crystals", Principles of Optics 5th Edition 1975, pp. 705-707.
Bourzac, "Magic Leap Needs to Engineer a Miracle", Intelligent Machines, Jun. 11, 2015, 7 pgs.
Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.
Bowley et al., "Variable-wavelength switchable Bragg gratings formed in polymer-dispersed liquid crystals", Applied Physics Letters, Jul. 2, 2001, vol. 79, No. 1, pp. 9-11.
Bronnikov et al., "Polymer-Dispersed Liquid Crystals: Progress in Preparation, Investigation and Application", Journal of Macromolecular Science Part B, published online Sep. 30, 2013, vol. 52, pp. 1718-1738.
Brown, "Waveguide Displays", Rockwell Collins, 2015, 11 pgs.
Bruzzone et al., "Compact, high-brightness LED illumination for projection systems", Journal of the SID 17/12, Dec. 2009, pp. 1043-1049.
Buckley et al., "Full colour holographic laser projector HUD", Light Blue Optics Ltd., Aug. 10, 2015, 5 pgs.
Buckley et al., "Rear-view virtual image displays", in Proc. SID Conference 16th Annual Symposium on Vehicle Displays, Jan. 2009, 5 pgs.
Buckley, "Colour holographic laser projection technology for heads-up and instrument cluster displays", Conference: Proc. SID Conference 14th Annual Symposium on Vehicle Displays, Jan. 2007, 5 pgs.
Buckley, "Pixtronix DMS technology for head-up displays", Pixtronix, Inc., Jan. 2011, 4 pgs.
Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.
Bunning et al., "Electro-optical photonic crystals formed in H-PDLCs by thiol-ene photopolymerization", American Physical Society, Annual APS, Mar. 3-7, 2003, abstract #R1.135.
Bunning et al., "Holographic Polymer-Dispersed Liquid Crystals (H-PDLCs)1", Annu. Rev. Mater. Sci., 2000, vol. 30, pp. 83-115.
Bunning et al., "Morphology of Anisotropic Polymer Dispersed Liquid Crystals and the Effect of Monomer Functionality", Polymer Science: Part B: Polymer Physics, Jul. 30, 1997, vol. 35, pp. 2825-2833.
Busbee et al., "SiO2 Nanoparticle Sequestration via Reactive Functionalization in Holographic Polymer-Dispersed Liquid Crystals", Advanced Materials, Sep. 2009, vol. 21, pp. 3659-3662.
Butler et al., "Diffractive Properties of Highly Birefringent vol. Gratings: Investigation", Journal of Optical Society of America, Feb. 2002, vol. 19, No. 2, pp. 183-189.
Cai et al., "Recent advances in antireflective surfaces based on nanostructure arrays", Mater. Horiz., 2015, vol. 2, pp. 37-53.
Cameron, "Optical Waveguide Technology & Its Application In Head Mounted Displays", Proc. of SPIE, May 22, 2012, vol. 8383, pp. 83830E-1-83830E-11.
Cameron, "The Application of Holographic Optical Waveguide Technology to Q-Sight™ Family of Helmet Mounted Displays", Proc. of SPIE, 2009, vol. 7326, 11 pages, doi:10.1117/12.818581.
Caputo et al., "POLICRYPS Composite Materials: Features and Applications", Advances in Composite Materials—Analysis of Natural and Man-Made Materials, www.intechopen.com, Sep. 2011, pp. 93-118.
Caputo et al., "POLICRYPS Switchable Holographic Grating: A Promising Grating Electro-Optical Pixel for High Resolution Display Application", Journal of Display Technology, Mar. 2006, vol. 2, No. 1, pp. 38-51.
Carclo Optics, "Guide to choosing secondary optics", Carclo Optics, Dec. 15, 2014, www.carclo-optics.com, 48 pgs.

(56) References Cited

OTHER PUBLICATIONS

Chen et al., "Polarization rotators fabricated by thermally-switched liquid crystal alignments based on rubbed poly(N- vinyl carbazole) films", Optics Express, Apr. 11, 2011, vol. 19, No. 8, pp. 7553-7558.
Cheng et al., "Design of an ultra-thin near-eye display with geometrical waveguide and freeform optics", Optics Express, Aug. 2014, 16 pgs.
Chi et al., "Ultralow-refractive-index optical thin films through nanoscale etching of ordered mesoporous silica films", Optic Letters, May 1, 2012, vol. 37, No. 9, pp. 1406-1408.
Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.
Cho et al., "Electro-optic Properties of CO2 Fixed Polymer/Nematic LC Composite Films", Journal of Applied Polymer Science, Nov. 5, 2000, vol. 81, Issue 11, pp. 2744-2753.
Cho et al., "Optimization of Holographic Polymer Dispersed Liquid Crystals for Ternary Monomers", Polymer International, Nov. 1999, vol. 48, pp. 1085-1090.
Colegrove et al., "P-59: Technology of Stacking HPDLC for Higher Reflectance", SID 00 Digest, May 2000, pp. 770-773.
Crawford, "Electrically Switchable Bragg Gratings", Optics & Photonics News, Apr. 2003, pp. 54-59.
Cruz-Arreola et al., "Diffraction of beams by infinite or finite amplitude-phase gratings", Investigacio' N Revista Mexicana De Fi'sica, Feb. 2011, vol. 57, No. 1, pp. 6-16.
Dabrowski, "High Birefringence Liquid Crystals", Crystals, Sep. 3, 2013, vol. 3, No. 3, pp. 443-482.
Dainty, "Some statistical properties of random speckle patterns in coherent and partially coherent illumination", Optica Acta, Mar. 12, 1970, vol. 17, No. 10, pp. 761-772.
Date et al., "52.3: Direct-viewing Display Using Alignment-controlled PDLC and Holographic PDLC", Society for Information Display Digest, May 2000, pp. 1184-1187, DOI: 10.1889/1.1832877.
Date et al., "Full-color reflective display device using holographically fabricated polymer-dispersed liquid crystal (HPDLC)", Journal of the SID, 1999, vol. 7, No. 1, pp. 17-22.
Date, "Alignment Control in Holographic Polymer Dispersed Liquid Crystal", Journal of Photopolymer Science and Technology, Nov. 2, 2000, vol. 13, pp. 289-284.
De Bitetto, "White light viewing of surface holograms by simple dispersion compensation", Applied Physics Letters, Dec. 15, 1966, vol. 9, No. 12, pp. 417-418.
Developer World, "Create customized augmented reality solutions", printed Oct. 19, 2017, LMX-001 holographic waveguide display, Sony Developer World, 3 pgs.
Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.
Li et al., "Light Pipe Based Optical Train and its Applications", Proceedings vol. 5524, Novel Optical Systems Design and Optimization VII, Oct. 24, 2004, doi: 10.1117/12.559833, 10 pgs.
Li et al., "Novel Projection Engine with Dual Paraboloid Reflector and Polarization Recovery Systems", Wavien Inc., SPIE EI 5289-38, Jan. 21, 2004, 49 pgs.
Li et al., "Polymer crystallization/melting induced thermal switching in a series of holographically patterned Bragg reflectors", Soft Matter, Jul. 11, 2005, vol. 1, pp. 238-242.
Lin et al., "Ionic Liquids in Photopolymerizable Holographic Materials", in book: Holograms—Recording Materials and Applications, Nov. 9, 2011, 21 pgs.
Liu et al., "Holographic Polymer Dispersed Liquid Crystals Materials, Formation and Applications", Advances in OptoElectronics, Nov. 30, 2008, vol. 2008, Article ID 684349, 52 pgs.
Lorek, "Experts Say Mass Adoption of augmented and Virtual Reality is Many Years Away", Siliconhills, Sep. 9, 2017, 4 pgs.
Lowenthal et al., "Speckle Removal by a Slowly Moving Diffuser Associated with a Motionless Diffuser", Journal of the Optical Society of America, Jul. 1971, vol. 61, No. 7, pp. 847-851.

Lu et al., "Polarization switch using thick holographic polymer-dispersed liquid crystal grating", Journal of Applied Physics, Feb. 1, 2004, vol. 95, No. 3, pp. 810-815.
Lu et al., "The Mechanism of electric-field-induced segregation of additives in a liquid-crystal host", Phys Rev E Stat Nonlin Soft Matter Phys., Nov. 27, 2012, 14 pgs.
Ma et al., "Holographic Reversed-Mode Polymer-Stabilized Liquid Crystal Grating", Chinese Phys. Lett., 2005, vol. 22, No. 1, pp. 103-106.
Mach et al., "Switchable Bragg diffraction from liquid crystal in colloid-templated structures", Europhysics Letters, Jun. 1, 2002, vol. 58, No. 5, pp. 679-685.
Magarinos et al., "Wide Angle Color Holographic infinity optics display", Air Force Systems Command, Brooks Air Force Base, Texas, AFHRL-TR-80-53, Mar. 1981, 100 pgs.
Marino et al., "Dynamical Behaviour of Policryps Gratings", Electronic-Liquid Crystal Communications, Feb. 5, 2004, 10 pgs.
Massenot et al., "Multiplexed holographic transmission gratings recorded in holographic polymer-dispersed liquid crystals: static and dynamic studies", Applied Optics, 2005, vol. 44, Issue 25, pp. 5273-5280.
Matay et al., "Planarization of Microelectronic Structures by Using Polyimides", Journal of Electrical Engineering, 2002, vol. 53, No. 3-4, pp. 86-90.
Mathews, "The LED FAQ Pages", Jan. 31, 2002, 23 pgs.
Matic, "Blazed phase liquid crystal beam steering", Proc. of the SPIE, 1994, vol. 2120, pp. 194-205.
McLeod, "Axicons and Their Uses", Journal of the Optical Society of America, Feb. 1960, vol. 50, No. 2, pp. 166-169.
McManamon et al., "A Review of Phased Array Steering for Narrow-Band Electrooptical Systems", Proceedings of the IEEE, Jun. 2009, vol. 97, No. 6, pp. 1078-1096.
McManamon et al., "Optical Phased Array Technology", Proceedings of the IEEE, Feb. 1996, vol. 84, Issue 2, pp. 268-298.
Miller, "Coupled Wave Theory and Waveguide Applications", The Bell System Technical Journal, Short Hills, NJ, Feb. 2, 1954, 166 pgs.
Moffitt, "Head-Mounted Display Image Configurations", retrieved from the internet on Dec. 19, 2014, dated May 2008, 25 pgs.
Nair et al., "Enhanced Two-Stage Reactive Polymer Network Forming Systems", Polymer (Guildf). May 25, 2012, vol. 53, No. 12, pp. 2429-2434, doi:10.1016/j.polymer.2012.04.007.
Nair et al., "Two-Stage Reactive Polymer Network Forming Systems", Advanced Functional Materials, 2012, pp. 1-9, DOI: 10.1002/adfm.201102742.
Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.
Natarajan et al., "Electro Optical Switching Characteristics of Volume Holograms in Polymer Dispersed Liquid Crystals", Journal of Nonlinear Optical Physics and Materials, 1997, vol. 5, No. 1, pp. 666-668.
Natarajan et al., "Electro-Optical Switching Characteristics of Volume Holograms in Polymer Dispersed Liquid Crystals", J. of Nonlinear Optical Physics Materials, Jan. 1996, vol. 5, No. 1, pp. 89-98.
Natarajan et al., "Holographic polymer dispersed liquid crystal reflection gratings formed by visible light initiated thiol-ene photopolymerization", Polymer, vol. 47, May 8, 2006, pp. 4411-4420.
Naydenova et al., "Low-scattering Volume Holographic Material", DIT PhD Project, http://www.dit.ie/ieo/, Oct. 2017, 2 pgs.
Neipp et al., "Non-local polymerization driven diffusion based model: general dependence of the polymerization rate to the exposure intensity", Optics Express, Aug. 11, 2003, vol. 11, No. 16, pp. 1876-1886.
Nishikawa et al., "Mechanically and Light Induced Anchoring of Liquid Crystal on Polyimide Film", Mol. Cryst. Liq. Cryst., Aug. 1999, vol. 329, 8 pgs.

(56) References Cited

OTHER PUBLICATIONS

Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.

Nordin et al., "Diffraction Properties of Stratified Volume Holographic Optical Elements", Journal of the Optical Society of America A., vol. 9, No. 12, Dec. 1992, pp. 2206-2217.

Oh et al., "Achromatic diffraction from polarization gratings with high efficiency", Optic Letters, Oct. 15, 2008, vol. 33, No. 20, pp. 2287-2289.

Olson et al., "Templating Nanoporous Polymers with Ordered Block Copolymers", Chemistry of Materials, Web publication Nov. 27, 2007, vol. 20, pp. 869-890.

Ondax, Inc., "Volume Holographic Gratings (VHG)", 2005, 7 pgs.

Orcutt, "Coming Soon: Smart Glasses That Look Like Regular Spectacles", Intelligent Machines, Jan. 9, 2014, 4 pgs.

Osredkar et al., "Planarization methods in IC fabrication technologies", Informacije MIDEM, 2002, vol. 32, 3, ISSN0352-9045, 5 pgs.

Osredkar, "A study of the limits of spin-on-glass planarization process", Informacije MIDEM, 2001, vol. 31, 2, ISSN0352-9045, pp. 102-105.

Ou et al., "A Simple LCOS Optical System (Late News)", Industrial Technology Research Institute/OES Lab. Q100/ Q200, SID 2002, Boston, USA, 2 pgs.

Paolini et al., "High-Power LED Illuminators in Projection Displays", Lumileds, Aug. 7, 2001, 19 pgs.

Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.

Park et al., "Fabrication of Reflective Holographic Gratings with Polyurethane Acrylates (PUA)", Current Applied Physics, Jun. 2002, vol. 2, pp. 249-252.

Plawsky et al., "Engineered nanoporous and nanostructured films", MaterialsToday, Jun. 2009, vol. 12, No. 6, pp. 36-45.

Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.

Presnyakov et al., "Electrically tunable polymer stabilized liquid-crystal lens", Journal of Applied Physics, Apr. 29, 2005, vol. 97, pp. 103101-1-103101-6.

Qi et al., "P-111: Reflective Display Based on Total Internal Reflection and Grating-Grating Coupling", Society for Information Display Digest, May 2003, pp. 648-651, DOI: 10.1889/1.1832359.

Ramón, "Formation of 3D micro- and nanostructures using liquid crystals as a template", Technische Universiteit Eindhoven, Apr. 17, 2008, Thesis, DOI:http://dx.doi.org/10.6100/IR634422, 117 pgs.

Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.

* cited by examiner

WEARABLE DATA DISPLAY

CROSS-REFERENCE TO RELATED APPLICATIONS

This application is a continuation of U.S. application Ser. No. 16/855,812 filed Apr. 22, 2020, which is a continuation of U.S. application Ser. No. 14/794,356 filed on Jul. 8, 2015, which is a continuation of U.S. application Ser. No. 14/240,643 filed Feb. 24, 2014 which is U.S. national phase of PCT Application No. PCT/GB20121000677 filed on Aug. 22, 2012, which claims the benefit of U.S. Provisional Patent Application No. 61/573,067 filed on Aug. 24, 2011, the disclosures of which are incorporated in their entirety by reference herein.

REFERENCE TO RELATED APPL1CATIONS

Each of the following applications is incorporated herein by reference in its entirety: PCT Application No. US2008/001909, with International Filing Date: 22 Jul. 2008, entitled LASER ILLUMINATION DEVICE: PCT Application No. US2006/043938, entitled METHOD AND APPARATUS FOR PROVIDING A TRANSPARENT DISPLAY; PCT Application No. PCT/GB2010/001982 entitled COMPACT EDGE ILLUMINATED EYEGLASS DISPLAY PCT Application No. PCT/GB2010/000835 with International Filing Date: 26 Apr. 2010 entitled COMPACT HOLOGRAPHIC EDGE ILLUMINATED EYEGLASS DISPLAY; and PCT Application No. PCF/GB2010/002023 filed on 2 Nov. 2010 entitled APPARATUS FOR REDUCING LASER SPECKLE, U.S. patent application Ser. No. 10/5,55,661 filed 4 Nov. 2005 entitled SWITCHABLE VIEWFINDER DISPLAY; U.S. Provisional Patent Application No. 61/344,748 with filing date 28 Sep. 2010 entitled EYE TRACKED HOLOGRAPHIC EDGE ILLUMINATED EYEGLASS DISPLAY; No. 61/457,835 with filing date 16 Jun. 2011 entitled HOLOGRAPHIC BEAM STEERING DEVICE FOR AUTOSTEREOSCOPIC DISPLAYS; and U.S. Provisional Patent Application No. 61/573,066 with filing date 24 Aug. 2011 by the present inventors entitled IMPROVEMENTS TO HOLOGRAPHIC POLYMER DISPERSED LIQUID CRYSTAL MATERIALS AND DEVICES.

BACKGROUND

This invention relates to a wearable display device, and more particular to a wearable display using electrically switchable holographic optical elements.

There is a requirement for a compact see through data display capable of displaying image content ranging from symbols and alphanumeric characters to high-resolution pixelated images. The display should be highly transparent and the displayed image content should be clearly visible when superimposed over a bright background scene. The display should provide full colour with an enhanced colour gamut for optimal data visibility and impact. A prime requirement is that the display should be as easy to wear, natural and non-distracting as possible with a form factor similar to that of ski goggles or, more desirably, sunglasses. The eye relief and pupil should be big enough to avoid image loss during head movement even for demanding military and sports activities. The image generator should be compact, solid state and have low power consumption.

The above goals are not achieved by current technology. Current wearable displays only manage to deliver see through, adequate pupils, eye relief and field of view and high brightness simultaneously at the expense of cumbersome form factors. In many cases weight is distributed in the worst possible place for a wearable display, in front of the eye. The most common approach to providing see through relies on reflective or diffractive visors illuminated off axis. Microdisplays, which provide high-resolution image generators in tiny flat panels, do not necessarily help with miniaturizing wearable displays because the requirement for very high magnifications inevitably results in large diameter optics. Several ultra low form factor designs offering spectacle-like form factors are currently available but usually require aggressive trade-offs against field of views eye relief and exit pupil.

The optical design benefits of diffractive optical elements (DOEs) are well known including unique and efficient form factors and the ability to encode complex optical functions such as optical power and diffusion into thin layers. Bragg gratings (also commonly termed volume phase gratings or holograms), which offer the highest diffraction efficiencies, have been widely used in devices such as Head Up Displays. It is also known that diffractive optical elements can be used to provide virtual images for direct viewing or for viewing with the aid of optical systems. U.S. Pat. No. 6,052,540 by Koyama discloses a viewfinder device comprising a transmission hologram that can be located at a position other than in an image plane. The position of the virtual imago formed by the transmission hologram is arranged to lie at the image plane of the optical system.

n important class of diffractive optical element known as an electrically Switchable Bragg Gratings (SBG) is based on recording Bragg gratings into a polymer dispersed liquid crystal (PDLC) mixture. Typically, SBG devices are fabricated by first placing a thin film of a mixture of photopolymerisable monomers and liquid crystal material between parallel glass plates. One or both glass plates support electrodes, typically transparent indium tin oxide films, for applying an electric field across the PDLC layer. Bragg grating is then recorded by illuminating the liquid material with two mutually coherent laser beams, which interfere to form the desired grating structure. During the recording process, the monomers polymerize and the PDLC mixture undergoes a phase separation, creating regions densely populated by liquid crystal micro-droplets, interspersed with regions of clear polymer. The alternating liquid crystal-rich and liquid crystal-depicted regions form the fringe planes of the grating. The resulting Bragg grating can exhibit very high diffraction efficiency, which may be controlled by the magnitude of the electric field applied across the PDLC layer, in the absence of an applied electric field the SBG remains in its diffracting state. When an electric field is applied to the hologram via the electrodes, the natural orientation of the LC droplets is changed thus reducing the refractive index modulation of the fringes and causing the hologram diffraction efficiency to drop to very low levels. The diffraction efficiency of the device can be adjusted, by means of the applied voltage, over a continuous range from essentially zero to near 100%. U. S. Pat. No. 5,942,157 by Sutherland et al. and U.S. Pat. No. 5,751, 452 by Tanaka et al. describe monomer and liquid crystal material combinations suitable for fabricating SBG devices.

There is a requirement for a compact, lightweight wearable data display providing a high brightness, high contrast information display with a high degree of transparency to external light.

SUMMARY

It is an object of the present invention to provide a compact, lightweight wearable data display providing high brightness and high contrast information visibility with a high degree of transparency to external light.

The objects of the invention are achieved in a first embodiment in which there is provided a transparent wearable data display comprising: a source; a means of collimating light from source; a means for deflecting the collimated light into a scanned beam; a first array comprising one column containing N switchable grating elements sandwiched between first and second parallel transparent substrates, the substrates together functioning as a first light guide; a second array comprising integer M columns and integer N rows of switchable grating elements sandwiched between third and fourth parallel transparent substrates, the substrates together functioning as a second light guide. Transparent electrodes are applied to the first and second and the third and fourth substrates. Each switchable grating element has a diffracting state and a non diffracting state. The apparatus further comprises a first coupling means for directing the scanned beam into a first total internal reflection (TIR) light path between the outer surfaces of the first light guide along the first array column; and a second coupling means linking each element of the first array to the first element of a row of elements of the second array. Each element of the first array when in its diffracting state directing light via the second coupling means into a second TIR path along a row of the second array for directing the first TIR light into a second TIR path between the outer surfaces of the second light guide along a row of elements of the second array. At least one of said electrodes of the first array is patterned into 1×N independently switchable elements each element overlapping one of the, first array grating elements. At least one of the electrodes of said second array is patterned into M×N independently switchable elements, each element overlapping one of the second array grating elements. In one embodiment of the invention each element of the first array is disposed adjacent to a first element of a row of said second array.

In one embodiment of the invention each switchable grating element has a diffracting state when no electric field is applied across the electrodes sandwiching the grating element and a non diffracting state when a field is applied across the electrodes. Each element of the first array when in its diffracting state directs light from the first TIR path into the second TIR path starting at the first element of a row of elements of the second array and proceeding along said row. In one embodiment of the invention the elements of said first array are switched sequentially into their diffracting states. In one embodiment of the invention the elements of rows of the second array adjacent an element of the first array in its diffracting state are switched sequentially into their diffracting states. Each element: of the second array when in its diffracting state deflects light through the fourth substrate.

In one embodiment of the invention each grating element of the second array encodes image information.

In one embodiment of the invention the outer surface of the fourth substrate faces a viewer of the display.

In one embodiment of the invention an element of the second array in its diffracting state forms an image of the information encoded within the grating clement at a predefined viewing range and an angular bearing defined by the sweep angles of the scanned beam.

In one embodiment f the invention the substrates of the first array are parallel to the substrates of the second array.

In one embodiment of the invention the substrates of the first array are orthogonal to the substrates of the second array.

In one embodiment of the invention the first coupling means is a grating device.

In one embodiment of the invention the second coupling means is a grating device abutting each of the first and second arrays.

In one embodiment of the invention each switchable grating element of the output array is divided into independently switchable columns aligned orthogonally to the TIR path direction in the output array.

In one embodiment of the invention a switchable grating is a Switchable Bragg Grating (SBG).

In one embodiment of the invention the scanned beam is characterized by angular deflections in two orthogonal directions.

In one embodiment of the invention the intensity of the scanned beam is modulated by varying the refractive index modulation of at least one of the switchable grating elements traversed by the beam.

In one embodiment of the invention the source of collimated light provides first, second and third wavelength light.

In one embodiment of the invention the source of collimated light provides comprises first second and third wavelength light and each switchable grating element is a multiplexed SBG comprising a first grating for diffracting first wavelength light and a second grating for diffracting second and third wavelength light.

In one embodiment of the invention the source of collimated light provides comprises first second and third wavelength light and each switchable grating element is a multiplexed SBG comprising a first grating for diffracting first wavelength light, a second grating for diffracting second wavelength light and third grating for diffracting third wavelength light.

In one embodiment of the invention a switchable grating clement comprises a surface relief grating backfilled, with an electrically variable refractive index medium.

In one embodiment of the invention each switchable grating element in at least one of the first array and second array is divided into independently switchable columns aligned orthogonally to the TIR paths. The refractive index modulation of each switchable column is dynamically controlled such that a predetermined amount of light is diffracted by the switchable column through the fourth substrate.

In one embodiment of the invention N is equal to 4 and M is equal to 4.

In one embodiment of the invention the data display is one of an identical pair of left and right eyepieces.

In one embodiment of the invention the means for providing a scanned beam comprises: a first transparent optical substrate with an input surface and an output surface; a second transparent optical substrate with an input surface and an output surface; transparent electrodes applied to the output surface of the first substrate, and the input surface of the second substrate; an electrically variable refractive index layer having a planar surface and a second surface shaped to provide an array of prisms; and a fixed refractive index layer having a planar surface and a second surface shaped to provide an array of prismatic cavities. The prisms and prismatic cavities have identical and opposing geometries, each prism abutting one of said prismatic cavities. The planar surface of the variable refractive index layer abuts the output surface of the first substrate and the planar surface of the fixed refractive index layer abuts the input surface of the second substrate. The transparent electrodes are electrically coupled to a variable voltage generating means. At least one of the transparent electrodes is patterned into independently switchable electrode elements having substantially the same cross sectional area as the prisms such that said the refractive index prisms may be selectively switched in discrete steps from a fully diffracting to a non diffracting state by an electric field applied across the transparent electrodes.

A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

DETAILED DESCRIPTION

The invention will now be further described by way of example only with reference to the accompanying drawings.

It will apparent to those skilled in the art that the present invention may be practiced with some or all of the present invention as disclosed in the following description. For the purposes of explaining the invention well-known features of optical technology known to those skilled in the art of optical design and visual displays have been omitted or simplified in order not to obscure the basic principles of the invention.

Unless otherwise stated the term "on-axis" in relation to a ray or a beam direction refers to propagation parallel to an axis normal to the surfaces of the optical components described in relation to the invention. In the following description the terms light, ray, beam and direction may be used interchangeably and in association with each other to indicate the direction of propagation of light energy along rectilinear trajectories.

Parts of the following description will be presented using terminology commonly employed by those skilled in the art of optical design.

It should also be noted that in the following description of the invention repeated usage of the phrase "in one embodiment" does not necessarily refer to the sane embodiment.

Figure 1:
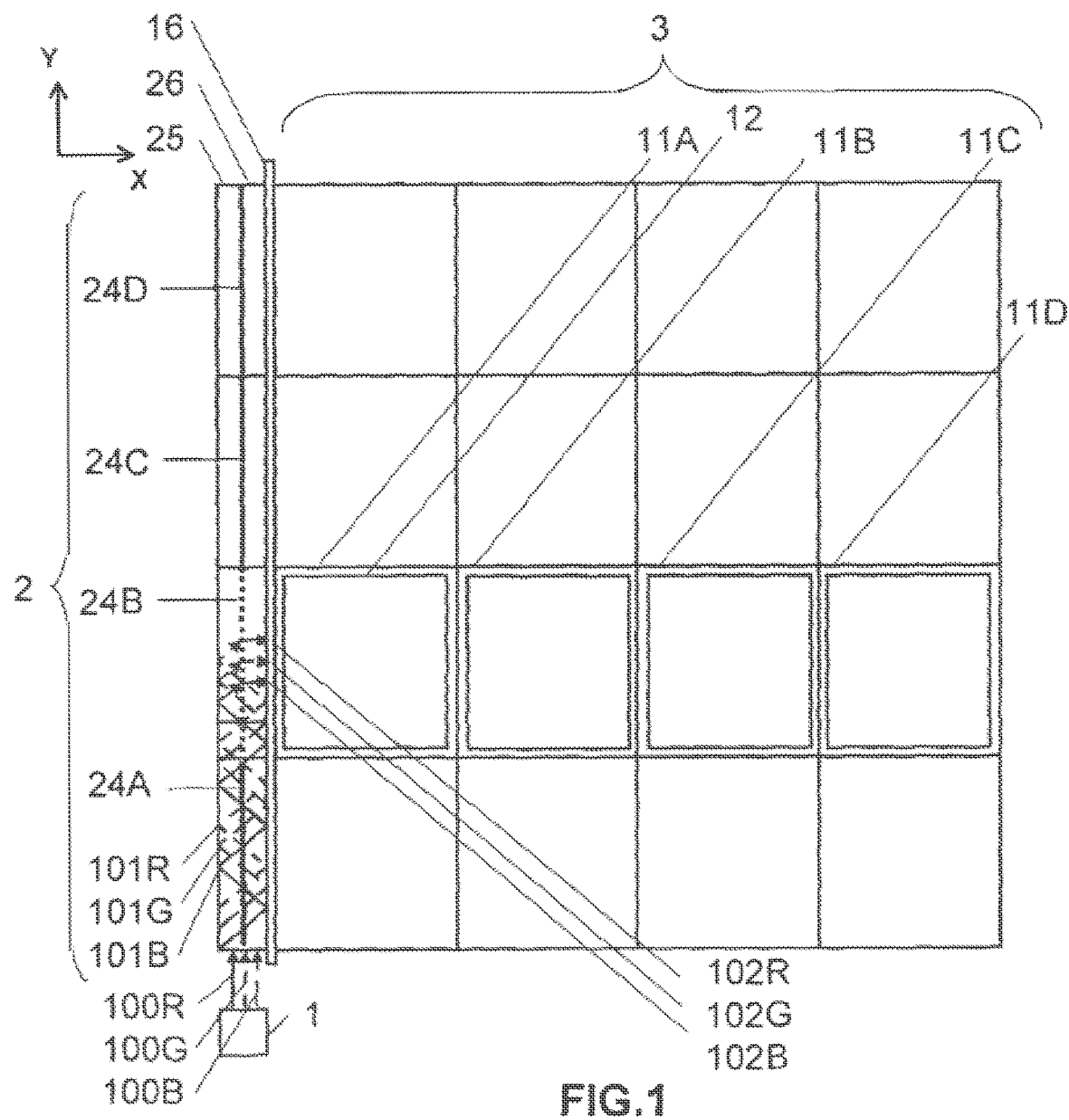
FIG. 1 is a schematic front elevation view of a wearable display in a first embodiment of the invention.

In a first embodiment of the invention illustrated in the schematic front elevation view of FIG. 1 there is provided a transparent wearable data display comprising: an illumination source 1, a first switchable grating array 2 and a second switchable grating array 3. The display provides an eyepiece that may be one of pair of identical elements used in a binocular display. Alternatively the display may simply provide a monocular eyepiece. The illumination source which will be discussed in more detail later in the description comprises a light source, a means for collimating the light; and a means for deflecting the collimated light into a scanned beam. Desirably, the source is a laser. The first array 2 comprises one column and integer number N switchable grating elements (1×N,) sandwiched between first and second parallel transparent substrates 25, 26. The substrates 25, 26 together function as a first light guide. The second array comprises M columns and N rows of switchable grating elements sandwiched between third and fourth parallel transparent substrates 30, 31. The substrates 30, 31 together function as a second light guide. The substrates 30, 31 are in orthogonal planes to those of 25, 26. Transparent electrodes which are not illustrated are applied to the first and second and the third and fourth substrates. Advantageously the electrodes are applied to opposing faces of the substrates. The electrodes are configured such that the applied electric field will be perpendicular to the substrates. The electrodes would typically be fabricated from Indium Tin Oxide (ITO). In one embodiment of the invention the outer surface of the fourth substrate faces a viewer of the display.

In one embodiment of the invention the switchable grating is a Switchable Bragg Grating (SBG).

In the embodiment of FIG. 1 the integer M is equal to 4 and N is equal to 4 in other words the first array is a 1×4 array and the second array is a 4×4 array. The invention does not assume any particular value for M or N.

The illumination source further comprises a first coupling means for directing the scanned beam into a first TIR light path between the outer surfaces of the first light guide along the first array column. There is further provided a second coupling moans 16 for directing the first TIR light into a second TIR path between the outer surfaces of the second light guide along a row of elements of the second array. In one embodiment of the invention the first coupling means is a grating device. In one embodiment of the invention the second coupling means is a grating device abutting each of the first and second arrays as indicated in FIG. 1.

At least one of said electrodes of the first array is patterned into 1×N independently switchable elements each element overlapping one of the first array grating elements. At least one of the electrodes of said second array is patterned into M×N independently switchable elements each element overlapping one of the second array grating elements. Again we will assume M=4 and N=4.

In one embodiment of the invention each element of the first array is disposed adjacent to a first element of a row of said second array. Each switchable grating element has a diffracting state when no electric field is applied across the electrodes sandwiching the grating element and a non diffracting state when a field is applied across the electrodes. Each element of the first array when in its diffracting state directs light torn the first T1R path into the second TIR path starting at the first element of a row of elements of the second array and proceeding along said row.

In one embodiment of the invention the elements of said first array are switched sequentially into their diffracting states. The elements of rows of the second array adjacent an element of the first array in its diffracting state are switched sequentially into their diffracting states. Each element of the second array when in its diffracting state deflects light through the fourth substrate towards the eye of the user of the display. The rows of the second array are switched sequentially. For example, in FIG. 1 the switchable grating elements of the first array are indicated by 24A-24D with the element 24B being indicated as being in its diffracting state by a dashed line. The diffracted light 102R, 102G, 102B is diffracted into the row of elements 11A-11D of the second array starting at element 11A. Input colour sequential red, green blue light from the light source 40 is indicated by the rays 100R, 100G, 100B. It should be noted that the light is in collimated spaced throughout the optical process to be described. The rays are coupled into the first array light guide into the TIR paths 101R, 101G, 101B which are coupled the TIR paths indicated by the rays 102R, 102G, 102B along the row of elements 11A-11B by the grating element 24B which is in its active state.

Figure 2:
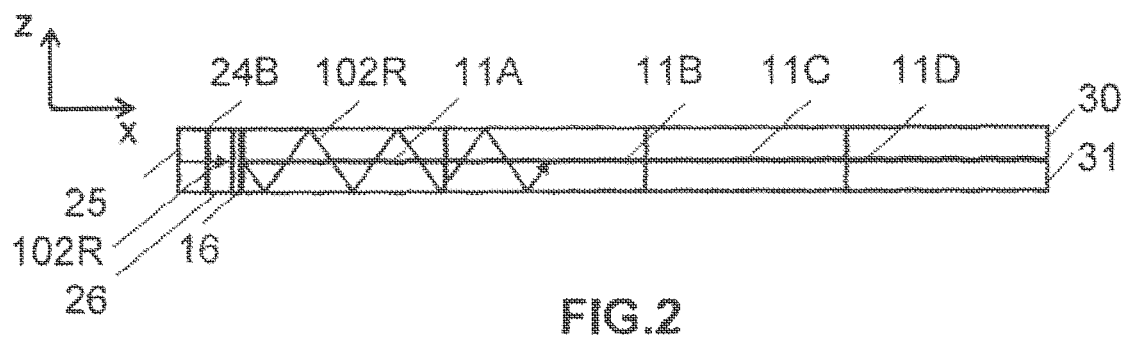
FIG. 2 is a schematic, cross-sectional view of a wearable display in a first embodiment of the invention.

FIG. 2 is a schematic cross-sectional view of the display showing the input array and the output array. The switchable grating element 24B of the first array and the row of switchable grating elements 11A-11B of the second array are illustrated. Only the red TIR path 102R is illustrated.

In one embodiment of the invention each grating element of the second array encodes image information. For the purpose of understanding the invention this image information may comprise a binary dot pattern or a symbol where the dots or symbols comprise regions of material into which gratings have been recorded surrounded by regions containing no gratings. In other words when illuminated by collimated light and in its diffracting state the grating element diffracts the light to form an linage corresponding to said image information. In one embodiment of the invention an am element of the second array in its diffracting state forms an image of the information encoded within the grating element at a predefined viewing range and an angular bearing defined by the instantaneous deflection angles of the scanned beam. The encoded information may comprise a numeric symbol or a portion of a numeric symbol. The information may be a gray level pixel. The information may be a binary pixel or symbol characterized solely by "on" and "off states. In other embodiments of the invention the information may provide a three dimensional or holographic image when the grating element is in its diffracting state. The invention does not assume any particular type of image information.

In one embodiment of the invention the source of collimated light provides color sequential red, green and blue illumination and each switchable grating element is a multiplexed Bragg grating comprising a first grating for diffracting red light and a second grating for diffracting blue and green light.

Figure 3:
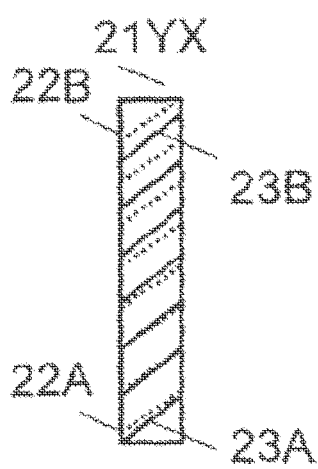
FIG. 3A is a schematic front elevation view of a switchable grating element in a first embodiment of the invention.
FIG. 3B is a schematic cross-sectional view of a switchable grating element in a first embodiment of the invention.
Figure 3:
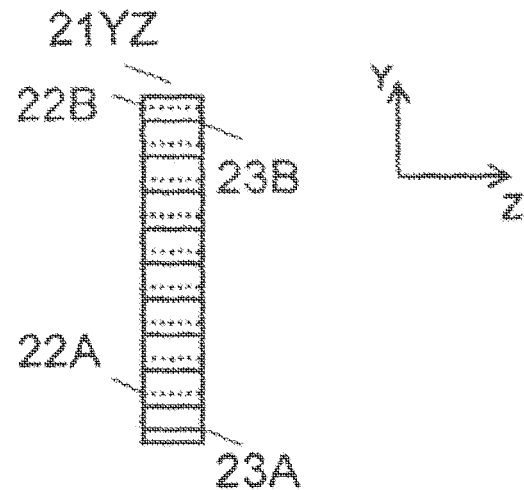

FIG. 3 illustrates the elements of the first array in more detail. FIG. 3A is a schematic plan view of a grating clement of the first array. The grating contains two multiplexed gratings having slant angles in the YX plane. The fringes 22A, 22B from the first grating and the fringes as 23A, 23B in the second grating are indicated. The same fringes are shown in the orthogonal YZ plane in FIG. 3B.

Figure 4:
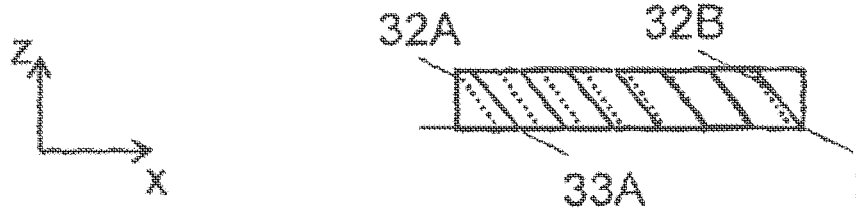
FIG. 4A is a schematic cross-sectional view of a switchable grating element in a first embodiment of the invention.
FIG. 4B is a schematic front elevation view of a switchable grating element a first embodiment of the invention.
Figure 4:
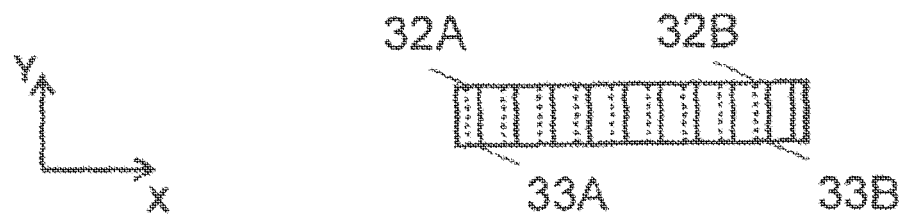

FIG. 4 illustrates the elements of the second array in more detail. FIG. 3A is a schematic cross sectional view of a switchable grating element of the second array. The grating contains two multiplexed gratings having slant angles in the ZX plane. The fringes 32A, 32B from the first grating and the fringes as 33A, 33B in the second grating are indicated. The same fringes are shown in the orthogonal YX plane in FIG. 4B.

In a further embodiment of the invention based on the embodiment of FIGS. 3-4 the switchable grating multiplexes separate red, green and blue diffracting Bragg gratings.

It should be apparent from consideration of FIGS. 3-4 that the invention may provide a monochrome display by recording a single monochrome grating within each switchable grating element. Further, since the display is fundamentally transparent red green and blue diffracting arrays maybe stacked to provide a colour display. However such an implementation of the invention would suffer faint increased thickness.

Figure 5:
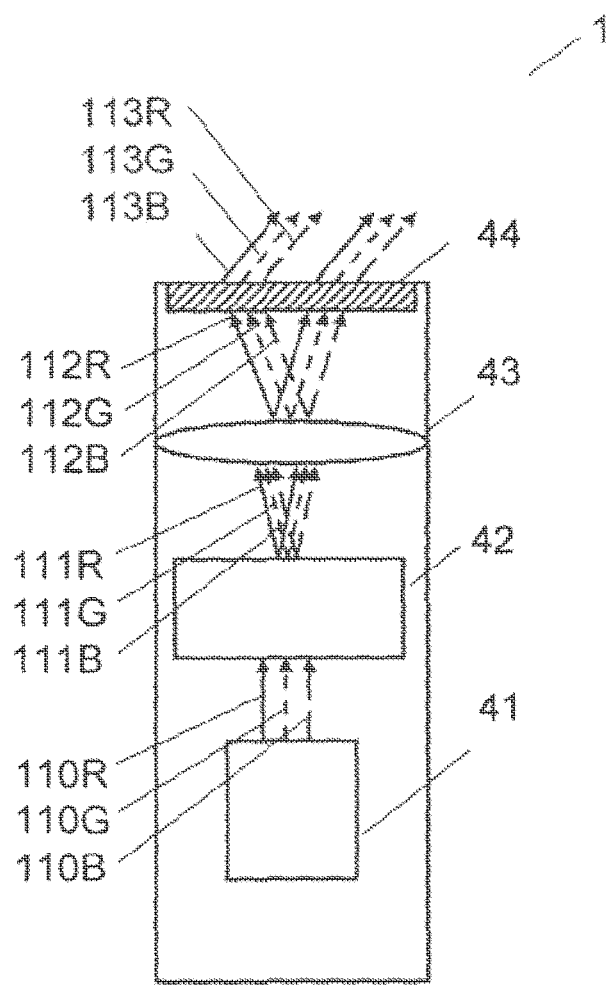
FIG. 5 is a schematic plan view of an illumination source in one embodiment of the invention.

FIG. 5 is a schematic plan view of an illumination source in one embodiment of the invention comprising a laser module emitting red, green and blue collimated light 110R, 110G, 110B, a scanner 42 providing the scanned beams 111R, 111G, 111B, and angular sweep expansion means 43 providing the beams 112R., 112G, 112B and a grating coupler 44 (essentially the first coupling means discussed above) for deflecting, scanned beams 113R, 113G, 113B into a TIR path insider the light guide formed by the first array. The angular sweep expansion means may comprise a focal system of lenses or other equivalent means known to those skilled in the art of optical design. The invention does not assume any particular configuration of the grating coupler with respect to the first array and many alternative schemes should be apparent to those skilled in the art of optical design. The grating coupler may employ any known grating technology. In a typical eyeglass where the display provides left and right eyepieces it would be ergonomically advantageous to integrate the illumination source within the aims of the spectacles.

In one embodiment of the invention the scanned beams are characterized by angular deflections in two orthogonal directions which advantageously correspond to the V and X coordinate directions indicated in FIG. 1. Techniques for scanning a beam in orthogonal direction are well documented in the prior art.

The invention does not assume any particular beam scanning method. Advantageously the scanner will be an electro optical device. However, devices based on piezoelectric deflectors and micro electro mechanical systems (MEMS) may be also considered. Separate scanners may be provided for red, green and blue light. Alternatively, a single scanner operating on colour sequential light from separate red green and blue sources may be used. The relative merits of such technologies in terms of scanning speed, optical efficiency, physical robustness, size and cost should be apparent to those skilled in the art of optical design.

In one embodiment of the invention, the scanner is similar to the electro optical micro scanner disclosed in U.S. Provisional Patent Application No. 61/457,835 by the present inventors with filing date 16 Jun. 2011 entitled HOLOGRAPHIC BEAM STEERING DEVICE FOR. AUTOSTEREOSCOPIC DISPLAYS. The micro scanner described in that reference comprises: a first transparent optical substrate with an input surface and an output surface; a second transparent optical substrate with an input surface and an output surface; transparent electrodes applied to the output surface of the first substrate and the input surface of the second substrate; an electrically variable refractive index layer having a planar surface and a second surface shaped to provide an array of prisms; and a fixed refractive index layer having a planar surface and a second surface shaped to provide an array of prismatic cavities. The prisms and prismatic cavities have identical and opposing geometries, each prism abutting one of the prismatic cavities. The planar surface of the variable refractive index layer abuts the output surface of the first substrate and the planar surface of the fixed refractive index layer abuts the input surface of the second substrate. The transparent electrodes are electrically coupled to a variable voltage generating means. At least one of the transparent electrodes is patterned into independently switchable electrode elements having substantially the same cross sectional area as the prisms such that the refractive index prisms may be selectively switched in discrete steps from a fully diffracting to a non diffracting state by an electric field applied across the transparent electrodes.

In one embodiment of the invention the scanner scans the light into discrete angular steps. In an alternative embodiment of the invention the scanner scans the light in continuous sweeps. In one embodiment of the invention the intensity of the scummed beam is modulated by varying the refractive index modulation of at least one of the switchable grating elements traversed by the beam. Advantageously the elements of the first array are used to modulate the beam. However, it will be apparent from consideration of the description and drawings that other modulation schemes based on varying the refractive index modulation of any of the grating elements along the beam path from the light source to the output surface of the display may be used.

Figure 6:
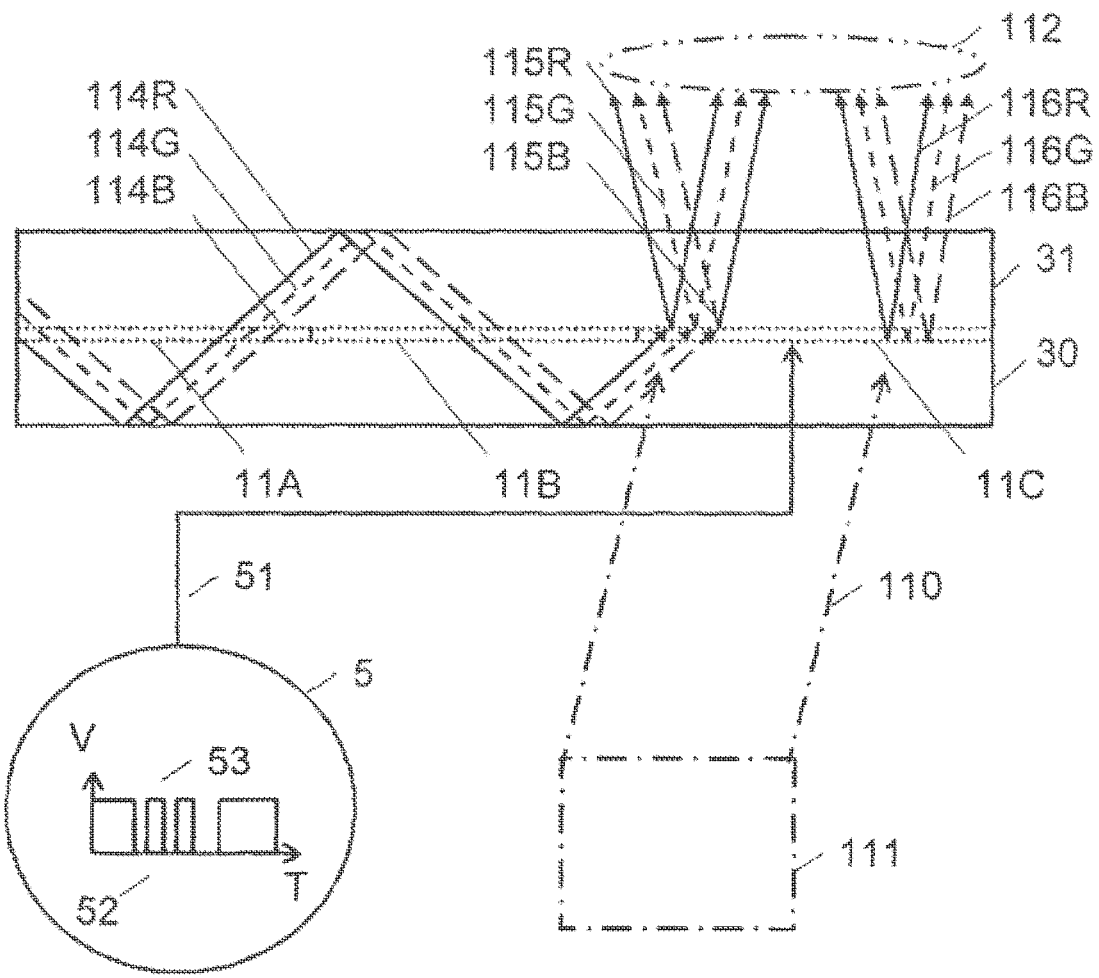
FIG. 6 is a schematic cross-sectional view of a portion of a wearable display in one embodiment of the invention.
Figure 7:
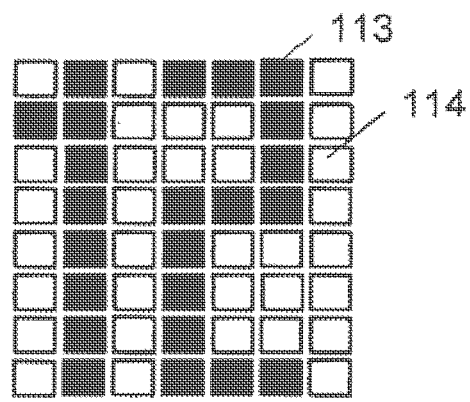
FIG. 7 is an example of an image provided in one embodiment of the invention.

The formation of a viewable image by the display is illustrated in more detail in FIGS. 6-7. In a typical application of the invention the viewable image is overlaid on the external scene in the manner of a Heads Up Display (HUD). FIG. 7 is a schematic cross-sectional view of a portion of the second array including the arming elements 11A-11C (see FIGS. 1-2). The element 11C is in its diffracting state. A voltage source for applying a voltage across each grating element is indicated by 5 and the circuit connection to the switching electrodes across the grating element is indicated by 51. Typically, an active matrix switching scheme would be used to control the voltages applied to the first and second arrays. The TIR path of the illumination light at one point in the beam angular sweep is indicated by the rays 114R, 114G, 114B. The light deflected out of the display at one extreme of the beam angular sweep is indicated by rays 115R, 115G, 115B and at the other extreme of the beam angular sweep by the rays 1166R, 116G, 116B. The output light forms a virtual image 111 at infinity. It should be apparent from consideration of FIG. 6 that by scanning the beam in the X and Y directions and modulating the voltage applied across the active grating element a symbol image such as the one illustrated in FIG. 7 may be written. The symbol image comprises bright pixels 113 and dark pixels 114. In this case the voltage modulation as indicated by the chart 52 showing voltage V plotted against time t would have a binary waveform represented by the characteristic 53. The output light is viewed through the pupil 112. It should be noted that each element of the second array requires a unique prescription to that all light diffracted out of the eye glass passes through an exit pupil through which the eye may observe the entire displayed image. It should be apparent that by switching the voltage to provide grey levels and taking advantage of the colour gamut provided by the red, green blue illumination more complex images may be generated.

Figure 8:
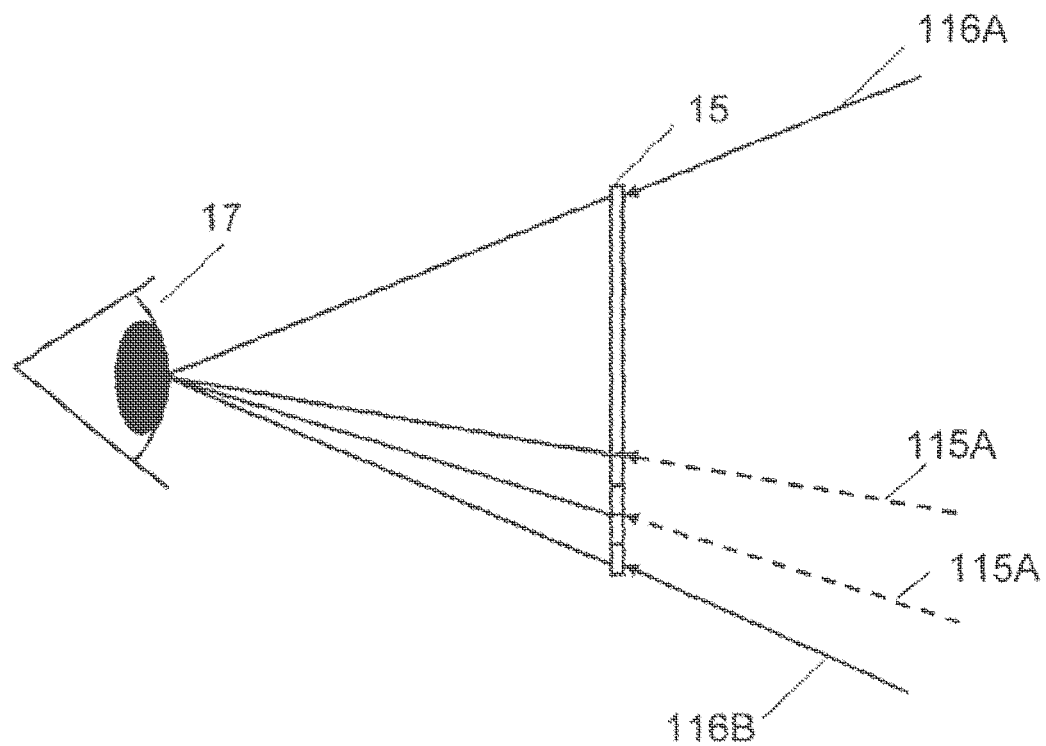
FIG. 8 is a schematic cross-section view of a wearable display eyepiece in one embodiment of the invention.

FIG. 8 is a schematic side elevation view of the display 15 in relation to the observer eve 17 in one embodiment of the invention, showing the angular extent of the display data in relation to the overall field of view defined by the physical aperture of the display. The limiting rays defining the overall field of view are illustrated by 115A, 115B. The rays 116A, 1116B define the vertical extent of the displayed data. In typical applications such as data displays for sports it is desirable to project data into the lower portion of the field of view. The data may extend across the full horizontal field if necessary.

Figure 9:
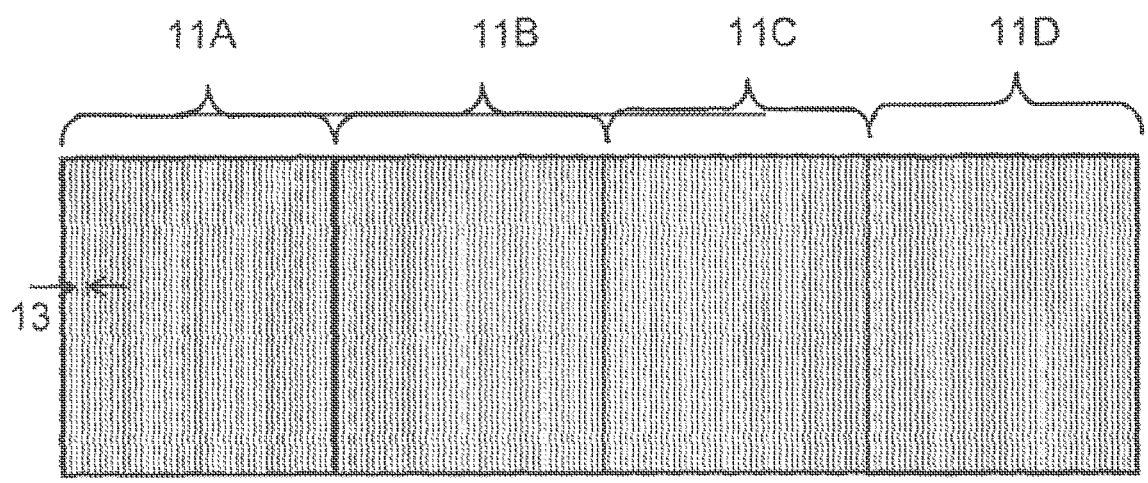
FIG. 9 is a schematic illustration showing the subdivision of grating elements into column shaped elements in one embodiment of the invention.

In one embodiment of the invention each switchable grating element in at least one of the input and output arrays is divided into independently switchable columns, aligned orthogonally to the TIR paths. FIG. 9 provides a front elevation of view of the elements 11A-11D of the second array. One column of the grating element 11A is indicated by the numeral 13. The invention does not place any restrictions on the width of and number of column elements in a column. The refractive index modulation of each switchable column is dynamically controlled by active matrix voltage control circuitry which is not illustrated. The refractive index modulation within a column can be set by the SBG recording conditions or can be varied dynamically by modulating each column in synchronization with the scanning of the input light. Alternatively, a combination of fixed and dynamic index modulation may be used.

The columns maximize the extraction of light from the light guide by diffracting a predetermined amount of light from an active column out of the display towards the eye. Non-diffracted or zero-order light which would otherwise be confined to the light guide by TIR is depleted in small steps each time the beam interacts with a column until all of the light has been extracted. In other applications of diffractive optical elements zero-order light is treated as a loss. However, in the present application the zero order light is recycled to allow uniform out-coupling of TIR light. The diffraction efficiency of individual column elements is controlled by adjusting the index modulation in synchronization with the beam scanning.

Figure 10:
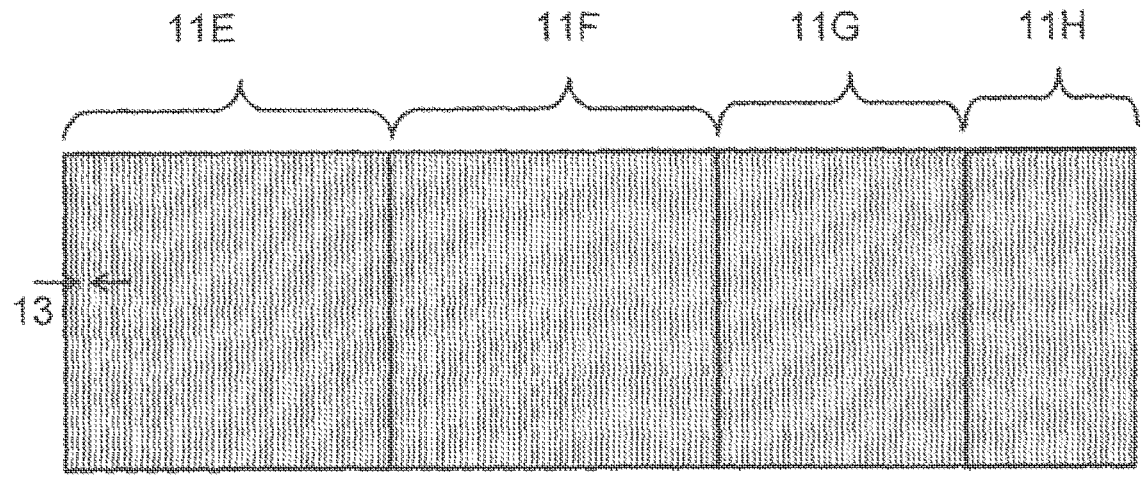
FIG. 10 is a schematic illustration showing the subdivision of grating elements into column shaped elements in one embodiment of the invention.

In the embodiment of the invention illustrated in FIG. 9 the grating elements are identical in size and contain equal numbers of columns. The use of columns elements as described above allows the grating element widths to vary across an array row as in the case of the grating elements indicated by 11E-11H in FIG. 10. The grating elements widths may be varied dynamically to match the extraction efficiency to the time varying beam angle. This overcomes the problem that T1R rays with incidence angles that do not meet the exact Bragg condition (off-Bragg rays) are diffracted with progressively diminishing efficiency as the angle increases up to the angular bandwidth limit, requiring more bounces before the beam or an acceptable portion of the beam is ejected from the light guide.

Figure 11:
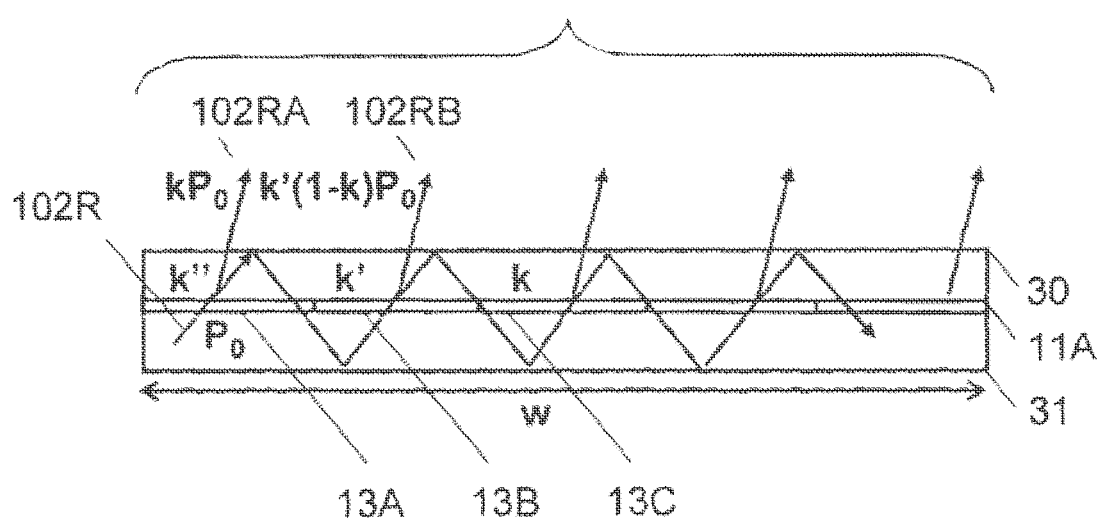
FIG. 11 is a schematic cross-sectional view of a portion of grating element subdivided into column elements showing the diffraction of TIR light.

FIG. 11 is a schematic plan view of a portion of the grating element 11A illustrating the propagation of TIR light through the columns labelled by 13A -13C. The TIR path light inside the light guide is indicated by the ray 102R. The diffraction efficiencies of the column elements 13A, 13B, 13C for rays meeting the exact Bragg diffraction angle (referred to as on-Bragg rays) are k, k', k" respectively. If the TIR light is injected into the light guide with power $P_0$ the power diffracted at element 13A is $kP_0$ in to the ray direction 102RA. The power diffracted at the element 13B is $k'(1-k)P_0$ into the ray direction 102RB and so on until most of the beam power has been extracted and the output light is distributed over the ray directions generally indicated by 120R. The k factors are specified to give a fixed light output at each bounce of the TIR beam ensuring a uniform light distribution across the exit pupil of the display. Other light distributions maybe obtained by suitable specification of the k-factors.

In embodiments of the invention. using the switchable column principle described above the grating element is no longer a fixed functional element of the display as discussed in relation to the embodiments of FIGS. 1-8. The term now describes the instantaneous extent of the set of columns over which extraction of the light corresponds to a defined image element (pixel) takes place. In addition to maximizing the extraction of light from the display the switchable columns principle also allow the output put light to be distributed uniformly over the exit pupil. Furthermore, the switchable column principle allow the size of the exit pupil to be expanded by using a sufficiently large subset of columns and matching the column prescriptions to the scanned beam ray directions. Switchable column designs for use with the present invention may be based on the embodiments and teachings disclosed in the U.S. Provisional Patent Application No. 61/457,835 with filing date 16 Jun. 2011 entitled HOLOGRAPHIC BEAM STEERING DEVICE FOR AUTOSTEREOSCOP1C DISPLAYS which is incorporated by reference herein in its entirety.

Figure 12:
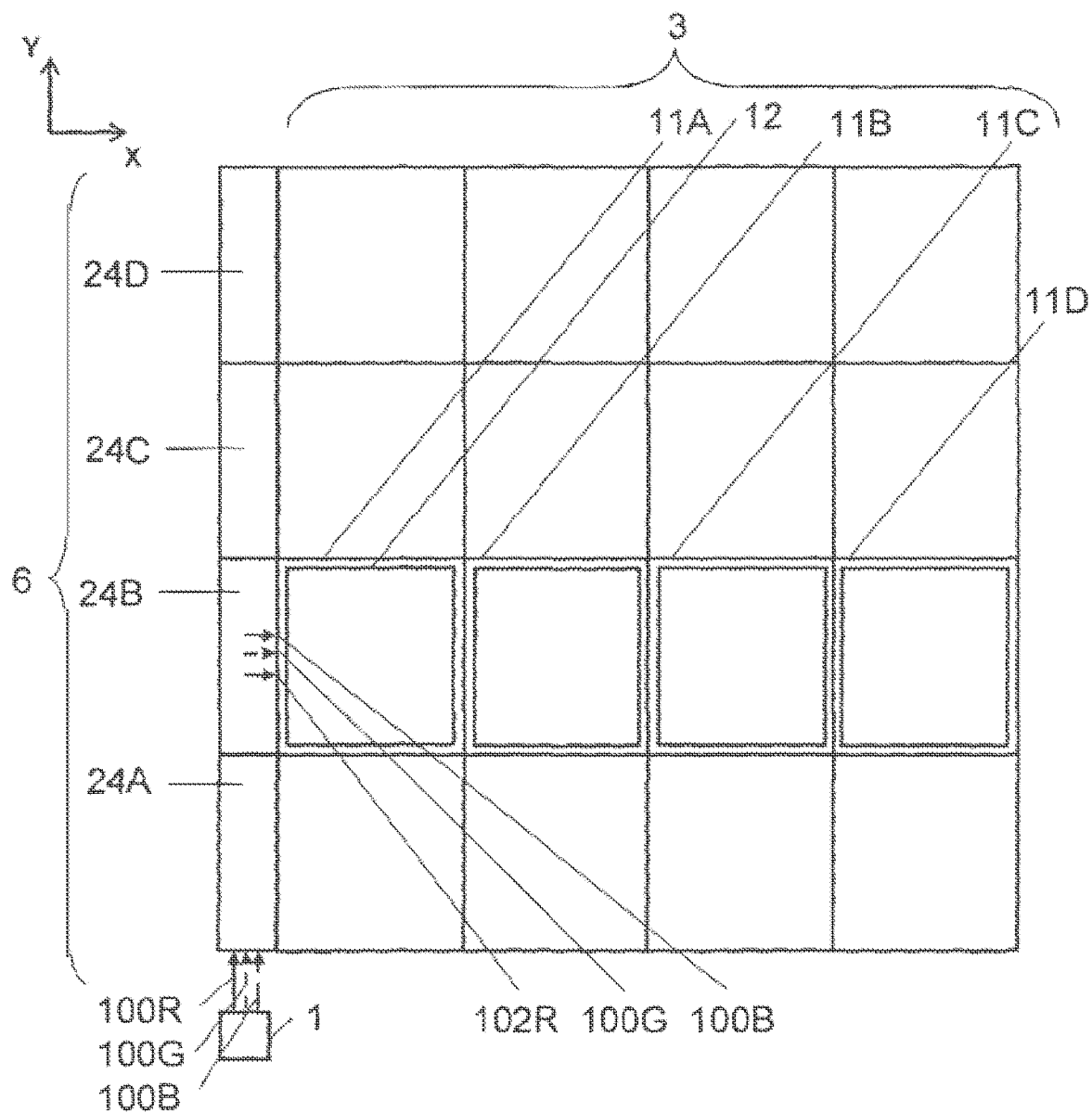
FIG. 12 is a schematic front elevation view of a wearable display in one embodiment of the invention.
Figure 13:
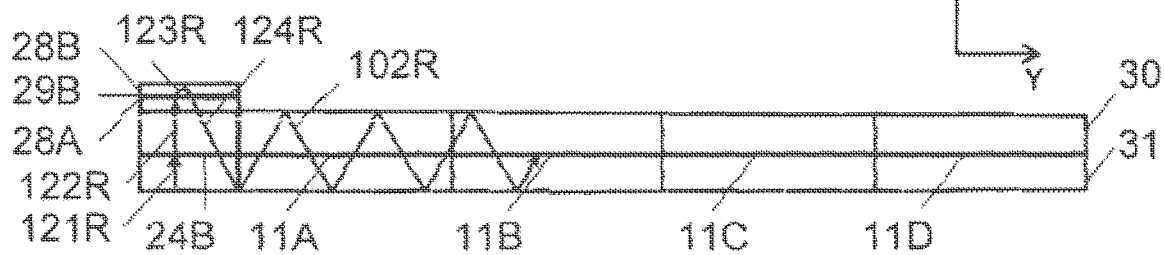
FIG. 13 is a schematic cross-sectional view of a wearable display in one embodiment of the invention.
Figures 14, 15:
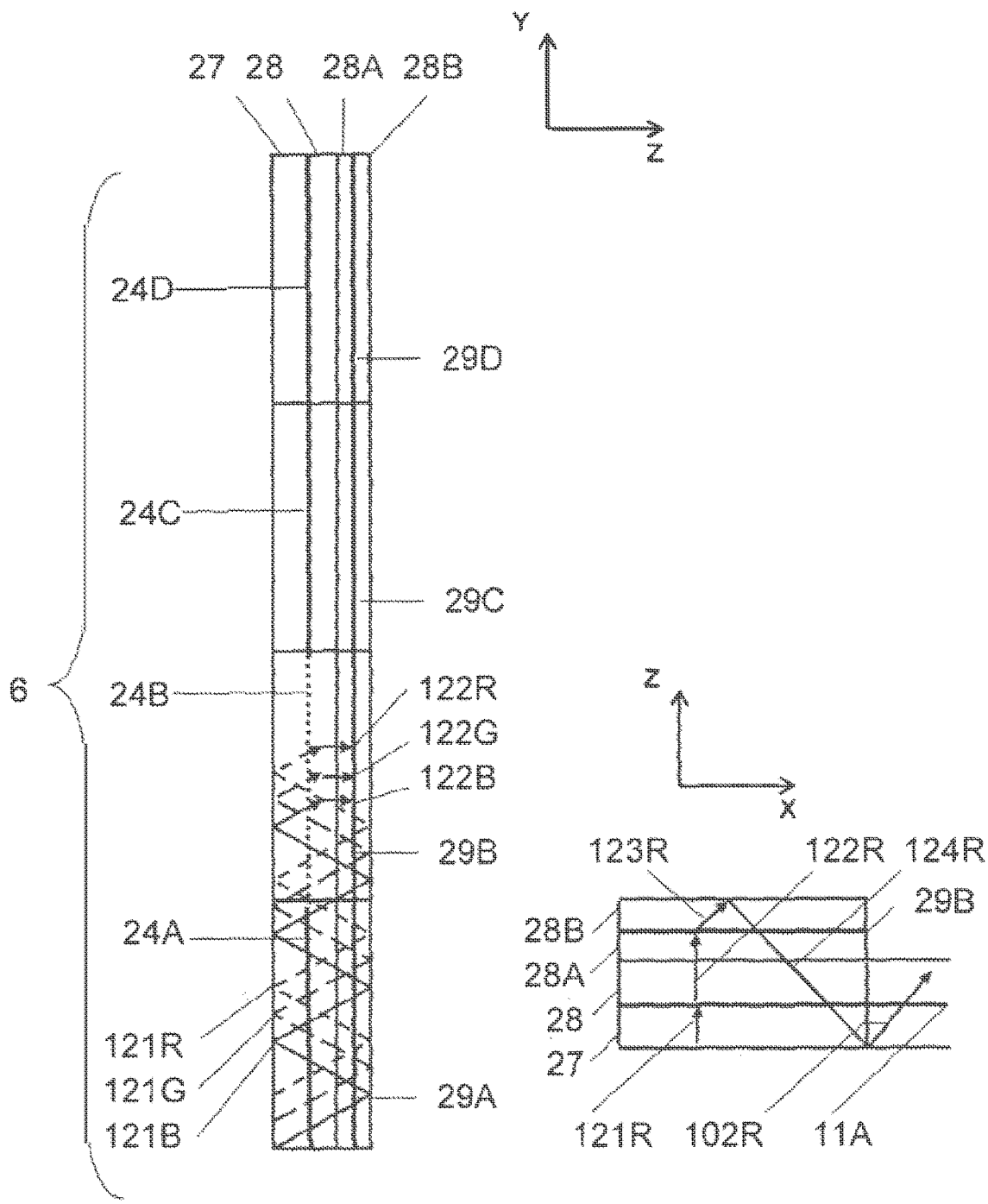
FIG. 14 is a schematic cross-sectional view of a wearable display in one embodiment of the invention.
FIG. 15 is a schematic cross-sectional view of a portion of a wearable display in one embodiment of the invention.

In the embodiment of FIG. 1 the first array is orthogonal the second array. In an alternative embodiment of the invention illustrated in FIGS. 12-15 the substrates of the first array are parallel to the substrates of the second array. The advantage of such a configuration which will now be discussed with reference to FIGS. 12-15 is that the first and second arrays may share common substrates and transparent electrode layers avoiding the fabrication problems of aligning the first and second arrays. Again the drawings are referred to the coordinate system defined by the axes labelled XYZ. FIG. 12 is a schematic front elevation view of the display showing the illumination source 1 the first array 6 which further comprises the elements 24A-24D and the second array 3. The illumination source and second array are unchanged from the embodiment of FIG. 1. FIG. 13 is a schematic cross-sectional view of the first and second arrays showing the propagation of red beam. FIG. 14 is a schematic cross sectional view of the first array 6 in the ZY plane. FIG. 15 is schematic cross sectional view of the first array in the ZX plane. The first and second arrays may abut as shown in FIG. 13. In alternative embodiments of the invention the first and second arrays may sandwich an air gap or a slab of transparent material. Turning now to FIG. 13 we see that the first and second arrays are sandwiched by the substrates 30, 31 to which transparent electrodes (not illustrated) are applied on opposing faces. The first array grating element 24B and the second array gratings elements 11A-11D are indicated. A passive grating device comprises a grating 29B sandwiched by substrates 28A, 28B abuts the substrate 30 overlapping the element 24A. As indicated in FIG. 14 the passive grating device extends over the entire length of the first array. Although the passive grating is illustrated as four distinct elements 29A-29D in FIG. 13 the grating will typically have a uniform prescription along its length. The illumination source injects colour-sequential TIR light 121R, 121G, 121B into the light guide formed by the first array substrates which is diffracted by the active element 24B into the ray directions 122R, 122G, 122B. The passive grating diffracts the light which is totally internally reflected at the outer surface of the substrate 28B as represented by the ray paths 123R, 124R lying in the plane ZY hi FIG. 12 and FIG. 14. The light then proceeds to follow the TIR path 102R within the second array. At least one of the first or second arrays may use the column element scheme described earlier.

In one embodiment of the invention a switchable grating element according to the principles of the invention is a surface relief grating backfilled with an electrically variable refractive index medium based on the embodiments and teachings disclosed in the U.S. Provisional Patent Application No. 61/457,835 with filing date 16 Jun. 2011 entitled HOLOGRAPHIC BEAM STEERING DEVICE FOR AUTOSTEREOSCOPIC DISPLAYS which is incorporated by reference herein in its entirety.

In order to ensure high transparency to external light, high contrast of displayed data (i.e. high diffraction efficiency) and very low haze due to scatter the following material characteristics are desirable. A low index-modulation residual grating, with a modulation not greater than 0.007, is desirable. This will require a good match between the refractive index of the polymer region and the ordinary index of the liquid crystal. The material should have a high index modulation capability with a refractive index modulation not less than 0.06. The material should exhibit very low haze for HPDLC cell thicknesses in the range 2-6 micron. The HPDLC should have a good index match (to within +0.015) for glass or plastic at 630 nm. One option is 1.515 (for example, 1737F or BK7 glasses). An alternative option would be 1.472 (for example Borofloat or 7740 Pyrex glasses).

Desirably the light sources are solid-state lasers. The low etenduc of lasers results in considerable simplification of the optics. LEDs may also be used with the invention. However, LEDs suffer from large etenduc, inefficient light collection and complex illuminator and projection optics. A further disadvantage with regard to SBGs is that LEDs are fundamentally unpolarized.

Any display device using lasers will tend to suffer from speckle. The present invention may incorporate any type of despeckler. Advantageously, the despeckler would be based on electro-optical principles. A despeckler for use with the present invention may be based on the disclosed embodiments and teachings of PCT Application No. US2008/001909, with International Filing Date: 22 Jul. 2008, entitled LASER. ILLUMINATION DEVICE, and PCT Application No. PCT/GB2010/002023 filed on 2 Nov. 2010 by the present inventors entitled APPARATUS FOR REDUCING LASER SPECKLE each of which is incorporated by reference herein in its entirety. The need for a despeckler may be eliminated by using a miniature, broadband (4 nm) RGB lasers of the type supplied by Epicrystal Inc.

Speckle arising from laser souses can be reduced by applying decorrelation procedures based on combining multiple sets of speckle patterns or cells from a given speckle-generating surface during the spatio-temporal resolution of the human eye. Desirably the despeckler is an electro-optical device configured to generate set of unique speckle phase cells by operating on the angular or polarization characteristic of rays propagating through the device. Furthermore, the despeckler device may be configured in several different ways to operate on one of more of the phase, and ray angular characteristics of incoming light. The invention does not rely on any particular despeckler technology. Any method for generating and averaging speckle cells may be used with the invention. However solid-state methods using SBGs offer more scope for miniaturization of the illuminator module.

The optical design of a wearable display according to the principles of the invention will be dictated by basic geometrical considerations well known to those skilled in the art of optical design. The goal is to maximize eye relief, exit pupil and field of view. Since these parameters will impact on geometrical aberrations, dispersion and other factors affecting image quality some performance versus form factor trade-offs are inevitable. The preferred light source is a laser. If broadband sources such as LEDs are used the design will require careful attention to the correction of chromatic dispersion and monochromatic geometrical aberrations. Dispersion is a problem for any DOE illuminated by a broadband source. The degree of defocus or image blur due to dispersion depends on the source spectral bandwidth and the distance from the DOE to the virtual image plane. Typically, the angular blur for a given wavelength and a source spectral bandwidth will be of the order of the bandwidth divided by the wavelength. The effect of monochromatic geometrical aberrations will depend on the field of view and pupil size.

A wearable display based on any of the above-described embodiments may be implemented using plastic substrates. Using sufficiently thin substrates such embodiments could be implemented as a long clear strip applique running from the nasal to ear ends of each eyeglass with a small illumination module continuing laser dies, light guides and display drive chip tucked into the sidewall of the eyeglass. Standard index matched glue would be used to fix the display to the surfaces of the eyeglasses. The plastic substrates may be fabricated from materials such as polycarbonate. The transparent electrodes may be fabricated from carbon nanotubes (CNTs) which may be more suitable than ITO for use with flexible substrates. The display may further comprise an environmental seal. A plastic SBG for use in the present invention may be based on the HPDLC material system and processes disclosed in a U.S. Provisional Patent Application No. 61/573,066 with filing date 24 Aug. 2011 by the present inventors entitled IMPROVEMENTS TO HOLOGRAPHIC POLYMER DISPERSED LIQUID CRYSTAL MATERIALS AND DEVICES, which is incoporated by reference herein in its entirety.

Although a planar display element using flat substrates has been discussed in the above description an eyepiece according to the principles of the invention may be fabricated using curved surfaces. The invention the invention may be used to provide a facetted surface display. In one embodiment of the invention the switchable gratings are SBGs operated in reverse mode. In reverse mode the SBG has low diffraction efficiency when no electric field is applied and has high efficiency when a field is applied. A reverse mode SBG fir use in the present invention may be based on the HPDLC material system and processes disclosed in U.S. Provisional Patent Application No. 61/573,066 with filing date 24 Aug. 2011 by the present inventors entitled IMPROVEMENTS TO HOLOGRAPHIC POLYMER DISPERSED LIQUID CRYSTAL MATERIALS AND DEVICES which is incriminated by reference herein in its entirety.

A key feature of all of the embodiments described above is that they provide the benefit of see-through. The latter is of great importance in Head Up Displays for automobile, aviation and other transport applications; private see-through displays such for security sensitive applications; architectural interior signage and many other applications. With the addition of a holographic brightness enhancing film, or other narrow band reflector affixed to one side of the display, the purpose of which is to reflect the display illumination wavelength light only, the see-through display can be made invisible (and hence secure) in the opposite direction of view. Here the reflected display illumination is effectively mirrored and therefore blocked in one direction, making it ideal for transparent desktop display applications in customer or personal interview settings common in bank or financial services settings.

Although the present application addresses wearable displays it will be clear that in any of the above embodiments the eye lens and retina may be replaced by any type of imaging lens and a screen. Any of the above described embodiments of the invention may be used in either directly viewed or virtual image displays. Possible applications range from miniature displays such as those used in viewfinders to large area public information displays. The above described embodiments may be used in applications where a transparent display is required. For example the invention may be used in applications where the displayed imagery is superimposed on a background scene such as heads up displays and teleprompters. The invention may be used to provide a display device that is located at or near to an internal image plane of an optical system. For example any of the above described embodiments may be used to provide a symbolic data display for a camera viewfinder in which symbol data is projected at an intermediate image plane and then magnified by a viewfinder eyepiece. It will be clear the invention may be applied in biocular or monocular displays. The invention may also be used in a stereoscopic wearable display. Any of the above described embodiments of the invention may be used in a rear projection television. The invention may be applied in avionic, industrial and medical displays. There are applications in entertainment, simulation, virtual reality, training systems and sport.

SBG arrays may be fabricated using a diffractive optical mask formed on a transparent sapphire wafer. The SBG cell optical prescriptions are defined on a cell to cell basis. The process of fabricating the SBG array may start with the creation of a multiphase computer generated hologram encoding the desired optical functions which is then holographically recorded in the SBG.

It should be noted that the total internal reflection ray paths shown in the drawings are meant to be schematic only. The number of total internal reflections will depend on the scrolling scheme used and the overall geometry of the light guide formed by the display layers. Typically, in order to ensure that TIR occurs the incidence angles must lie in the range of about 42 to about 70 degrees. It should be emphasized that the drawings are exemplary and that the dimensions have been exaggerated.

The method of fabricating the SBG pixel elements and the ITO electrodes used in any of the above-described embodiments of the invention may be based on the process disclosed in the PCT Application No. US2006/04398, claiming priority to U.S. provisional patent application 60/789,595 filed on 6 Apr. 2006, entitled METHOD AND APPARATUS FOR PROVIDING A TRANSPARENT DISPLAY, which is incorporated by reference herein its entirety.

The display devices disclosed in the present invention may employ features of the transparent edge lit display embodiments and teachings disclosed in U.S. patent application Ser. No. 10/555,661 filed 4 Nov. 2005 entitled SWITCHABLE VIEWFINDER DISPLAY which is incorporated by reference herein in its entirety.

The despeckler referred to in the above description may be based on the disclosed embodiments and teachings of PCT Application No. US2008/001909, with International Filing Date: 22 Jul. 2008, entitled LASER ILLUMINATION DEVICE, and PCT Application No. PCT/GB2010/

002023 filed on 2 Nov. 2010 by the present inventors entitled APPARATUS FOR REDUCING LASER SPECKLE each of which is incorporated by reference herein in its entirety.

The optical design of the display disclosed in the present, application may be guided by the teachings of PCT Application No. PCT/GB2010/001982 entitled COMPACT EDGE ILLUMINATED EYEGLASS DISPLAY by the present inventors (and also referenced by the Applicant's docket number SBG081PCT) which is incorporated by reference herein in its entirety.

The display disclosed in the present application may incorporate an eye tracker based on the embodiments and teachings disclosed in U.S. Provisional Patent Application No. 61/344,748 with filing date 28 Sep. 2010 entitled EYE TRACKED HOLOGRAPHIC EDGE ILLUMINATED EYEGLASS DISPLAY (and also referenced by the Applicant's docket number SBG092) which is incorporated by reference herein in its entirety.

The mean for scanning, collimated input light and the column array technique for improving the light extraction efficiency from switchable gratings discussed above may be based on the embodiments and teachings disclosed in the U.S. Provisional Patent Application No. 61/457,835 with filing date 16 Jun. 2011 entitled HOLOGRAPHIC BEAM STEERING DEVICE FOR AUTOSTEREOSCOPIC DISPLAYS which is incorporated by reference herein in its entirety.

The optical design of display disclosed in the present application may be guided by the teachings of PCT Application No. PCT/GB2010/000835 with International Filing Date: 26 Apr. 2010 entitled COMPACT HOLOGRAPHIC EDGE ILLUMINATED EYEGLASS DISPLAY which is incorporated by reference herein in its entirety, which discloses eyeglass display architectures based on a light guiding eyepiece in which a two dimension array of SBG deflectors is combined with an input beam.

The display disclosed in the present application may fabricated using the HPDLC material system and processes disclosed in a U.S. Provisional Patent Application No. 61/573,066 with filing date 24 Aug. 2011 by the present inventors entitled IMPROVEMENTS TO HOLOGRAPHIC POLYMER DISPERSED LIQUID CRYSTAL MATERIALS AND DEVICES which is incorporated by reference herein in its entirety.

It should be understood by those skilled in the art that while the present invention has been described with reference to exemplary embodiments, it is to be understood that the invention is not limited to the disclosed exemplary embodiments. Various modifications, combinations, sub-combinations and alterations may occur depending on design requirements and other factors insofar as they are within the scope of the appended claims or the equivalents thereof.

The invention claimed is:

1. A data display comprising:
a light source configured to provide collimated light modulated with image information for projection into a multiplicity of directions across a field of view (FOV);
a first light guide supporting a first array comprising one column containing M grating elements switchable between diffracting and non- diffracting states;
a second light guide supporting a second array comprising N columns and M rows of grating elements switchable between diffracting and non-diffracting states, wherein the first and second arrays are formed on one or more common substrates;
a first coupler for directing light from said light source into a first total internal reflection (TIR) light path within said first light guide; and
a second coupler for optically connecting each grating element of said first array to a corresponding first grating element of a row of grating elements of said second array, wherein the second coupler includes a passive grating parallel to the one or more common substrates; wherein:
a grating element of said first array in its diffracting state is configured to direct light via said second coupler into a second TIR path along a row of said second array;
a grating element of said second array in its diffracting state is configured to direct light out of said second light guide; and
each combination of an element of said first array in its diffracting state and an element of said second array In Its diffracting state provides a path for light projected into a unique portion of said FOV.

2. The data display of claim 1, wherein said light source is a laser scanning projector, wherein each said direction corresponds to a unique scanning beam angle.

3. The data display of claim 1, wherein said light source comprises a microdisplay and a projection lens, wherein each said direction corresponds to a projected beam angle corresponding to a unique pixel of said microdisplay.

4. The data display of claim 1, wherein each of said first and second light guides further comprises substrates sandwiching corresponding said grating elements, wherein each corresponding said substrate has a transparent electrode applied to a surface of corresponding said substrate, wherein at least one of said electrodes of said first array is patterned into 1×N independently switchable elements, each said independently switchable element of said first array overlapping one of said grating elements of said first array, and
wherein at least one of said electrodes of said second array is patterned into M×N independently switchable elements, each said independently switchable element of said second array overlapping one of said grating elements of said second array.

5. The data display of claim 4, wherein one of said grating element in said first and second arrays is in said non-diffracting state when an electric field is applied across two of said electrodes.

6. The data display of claim 1, wherein said first array and said second array are disposed on parallel planes.

7. The data display of claim 1, wherein each of said first and second couplers is a grating or a prism.

8. The data display of claim 1, wherein at least one said grating element in said first and second arrays is a grating recorded in a liquid crystal and polymer material system.

9. The data display of claim 1, wherein at least one said grating element in said first and second arrays is a surface relief grating backfilled with a refractive index medium.

10. The data display of claim 1, wherein said light source provides first, second, and third wavelength light.

11. The data display of claim 1, wherein each of said grating elements in said first and second arrays multiplexes a first grating for diffracting a first wavelength band of said collimated light and a second grating for diffracting a second wavelength band of said collimated light.

12. The data display of claim 1, wherein each grating element in at least one of said first array and said second array is divided into independently switchable elements.

13. The data display of claim 1, wherein said data display is one of a pair of left and right eyepieces.

14. The data display of claim 1, wherein said data display is wearable.

15. The data display of claim 1, configured to provide a transparent display.

16. The data display of claim 1, configured to form a virtual image.

17. The data display of claim 1, wherein at least said one grating element in said first second and second arrays has an electrically variable index modulation.

18. The data display of claim 1, wherein at least one said grating element in said first second and second arrays encodes image information.

19. The data display of claim 1, wherein the second coupler is disposed between two additional substrates aligned parallel to the one or more common substrates.

20. The data display of claim 1, wherein at least one of said grating element in said first and second arrays comprises a switchable Bragg grating.

* * * * *